United States Patent
Seo et al.

(10) Patent No.: US 10,672,116 B2
(45) Date of Patent: Jun. 2, 2020

(54) SUBSTRATE INSPECTION METHOD AND SYSTEM

(71) Applicant: KOH YOUNG TECHNOLOGY INC., Seoul (KR)

(72) Inventors: Seung Ae Seo, Hwaseong-si (KR); Yeon Hee Lee, Seoul (KR); Won Mi Ahn, Goyang-si (KR); Hye In Lee, Gwangmyeong-si (KR); Jong Hui Lee, Seoul (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 131 days.

(21) Appl. No.: 15/554,041

(22) PCT Filed: Jan. 29, 2016

(86) PCT No.: PCT/KR2016/000997
§ 371 (c)(1),
(2) Date: Aug. 28, 2017

(87) PCT Pub. No.: WO2016/137130
PCT Pub. Date: Sep. 1, 2016

(65) Prior Publication Data
US 2018/0040118 A1   Feb. 8, 2018

(30) Foreign Application Priority Data

Feb. 27, 2015 (KR) .................. 10-2015-0028627
Jan. 25, 2016 (KR) .................. 10-2016-0008813

(51) Int. Cl.
*G06K 9/00*   (2006.01)
*G06T 7/00*   (2017.01)
(Continued)

(52) U.S. Cl.
CPC .............. *G06T 7/0006* (2013.01); *G06T 7/11* (2017.01); *G06T 7/174* (2017.01); *G06T 7/521* (2017.01);
(Continued)

(58) Field of Classification Search
CPC ......... G06T 7/0006; G06T 7/62; G06T 7/521; G06T 7/11; G06T 7/174; G06T 17/00;
(Continued)

(56) References Cited

U.S. PATENT DOCUMENTS 6,167,355 A    12/2000  Fiekowsky
6,973,209 B2 * 12/2005  Tanaka .................. G01N 21/94
                                                  348/125

(Continued)

FOREIGN PATENT DOCUMENTS

CN   1339140    3/2002
CN   102628677  8/2012
(Continued)

OTHER PUBLICATIONS

International Search Report for International Application No. PCT/KR2016/000997, dated Apr. 29, 2016.
(Continued)

*Primary Examiner* — Gregory M Desire
(74) *Attorney, Agent, or Firm* — Kile Park Reed & Houtteman PLLC

(57) ABSTRACT

A substrate inspection system and substrate inspection method for setting an inspection region having a three-dimensional shape and/or a two-dimensional arbitrary shape as a region of interest on an image of a substrate. The substrate inspection method includes: generating and displaying a 2D image of a substrate based on image data acquired from the substrate having an inspection object; receiving first input information including arbitrary point
(Continued)

data or line data for setting a region of interest at a plurality of particular positions of the 2D image from a user; and displaying the region of interest corresponding to the point data or the line data as a 2D region of interest having an arbitrary shape in accordance with the first input information.

20 Claims, 25 Drawing Sheets

(51) Int. Cl.
| | |
|---|---|
| *G06T 7/62* | (2017.01) |
| *G06T 7/521* | (2017.01) |
| *G06T 7/11* | (2017.01) |
| *G06T 7/174* | (2017.01) |
| *G06T 17/00* | (2006.01) |
| *G01N 21/956* | (2006.01) |

(52) U.S. Cl.
CPC .............. *G06T 7/62* (2017.01); *G06T 17/00* (2013.01); *G01N 2021/95638* (2013.01); *G06T 2200/24* (2013.01); *G06T 2207/10028* (2013.01); *G06T 2207/20104* (2013.01); *G06T 2207/20212* (2013.01); *G06T 2207/20221* (2013.01); *G06T 2207/30141* (2013.01)

(58) Field of Classification Search
CPC ...... G06T 2200/24; G06T 2207/10028; G01N 2021/95638
See application file for complete search history.

(56) References Cited

U.S. PATENT DOCUMENTS

| | | | | |
|---|---|---|---|---|
| 8,369,603 | B2* | 2/2013 | Jeong | G01B 11/25 |
| | | | | 382/141 |
| 9,494,468 | B2* | 11/2016 | Wolfgruber | G01J 5/0255 |
| 2001/0021020 | A1* | 9/2001 | Nara | G03F 7/70616 |
| | | | | 356/394 |
| 2002/0009220 | A1 | 1/2002 | Tanaka | |
| 2002/0033449 | A1* | 3/2002 | Nakasuji | G01N 23/225 |
| | | | | 250/306 |
| 2009/0161942 | A1 | 6/2009 | Michelsson et al. | |
| 2011/0002529 | A1 | 1/2011 | Jeong et al. | |
| 2011/0191050 | A1 | 8/2011 | Jeong | |
| 2012/0140890 | A1* | 6/2012 | Ozawa | G01N 23/207 |
| | | | | 378/74 |
| 2012/0194647 | A1* | 8/2012 | Tomaru | G01B 11/2527 |
| | | | | 348/46 |
| 2012/0257041 | A1 | 10/2012 | Nakagaki et al. | |
| 2012/0307045 | A1 | 12/2012 | Hisano et al. | |
| 2013/0070078 | A1 | 3/2013 | Takagi et al. | |
| 2013/0077849 | A1 | 3/2013 | Jeong et al. | |
| 2013/0108147 | A1 | 5/2013 | Harada et al. | |
| 2013/0294679 | A1 | 11/2013 | Jeong et al. | |
| 2016/0224718 | A1 | 8/2016 | Jeong | |
| 2018/0040118 | A1* | 2/2018 | Seo | G06T 7/62 |
| 2018/0350060 | A1* | 12/2018 | Nakao | G06K 9/48 |

FOREIGN PATENT DOCUMENTS

| | | |
|---|---|---|
| CN | 103698910 | 4/2014 |
| JP | 5-102275 | 4/1993 |
| JP | 6-149967 | 5/1994 |
| JP | 10-47929 | 2/1998 |
| JP | 2011-119471 | 6/2011 |
| JP | 2011-222622 | 11/2011 |
| KR | 10-2011-0002977 | 1/2011 |
| KR | 10-2011-0088943 | 8/2011 |
| KR | 10-2011-0089519 | 8/2011 |
| KR | 10-2012-0133999 | 12/2012 |
| KR | 10-1457040 | 10/2014 |
| KR | 10-2015-0017421 | 2/2015 |

OTHER PUBLICATIONS

Supplementary European Search Report for European Application No. EP 16 75 5780; dated Oct. 1, 2018.
English translation of the Written Opinion of International Application No. PCT/KR2016/000997, dated Aug. 29, 2017.
Examination Report dated Oct. 31, 2019 from the European Patent Office corresponding to European Patent Application No. 16755780.0.
Chinese Office Action, with English translation, corresponding to Chinese Application No. 201680012305.1, dated Jan. 21, 2020.

* cited by examiner

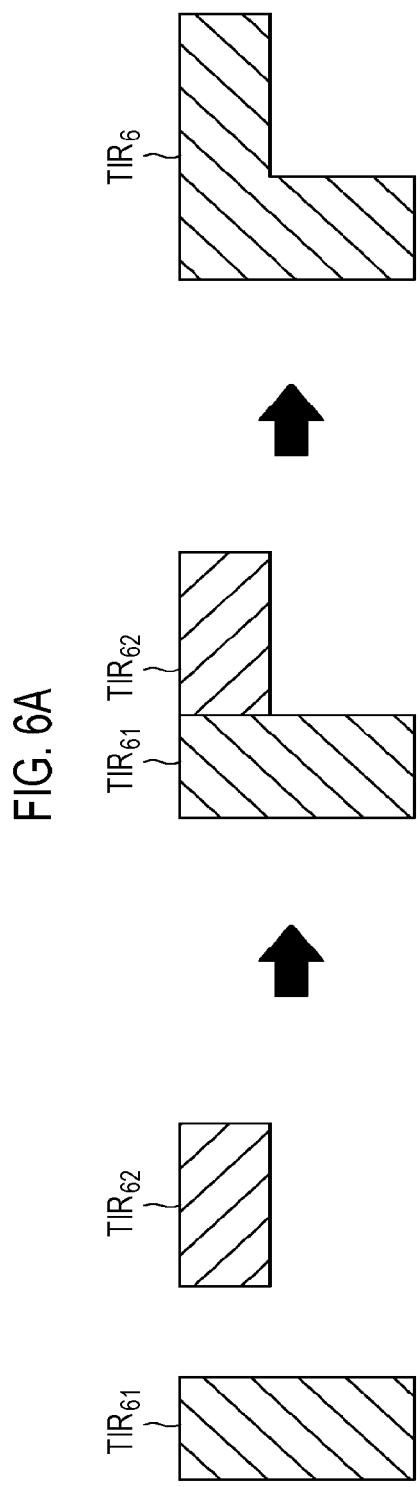

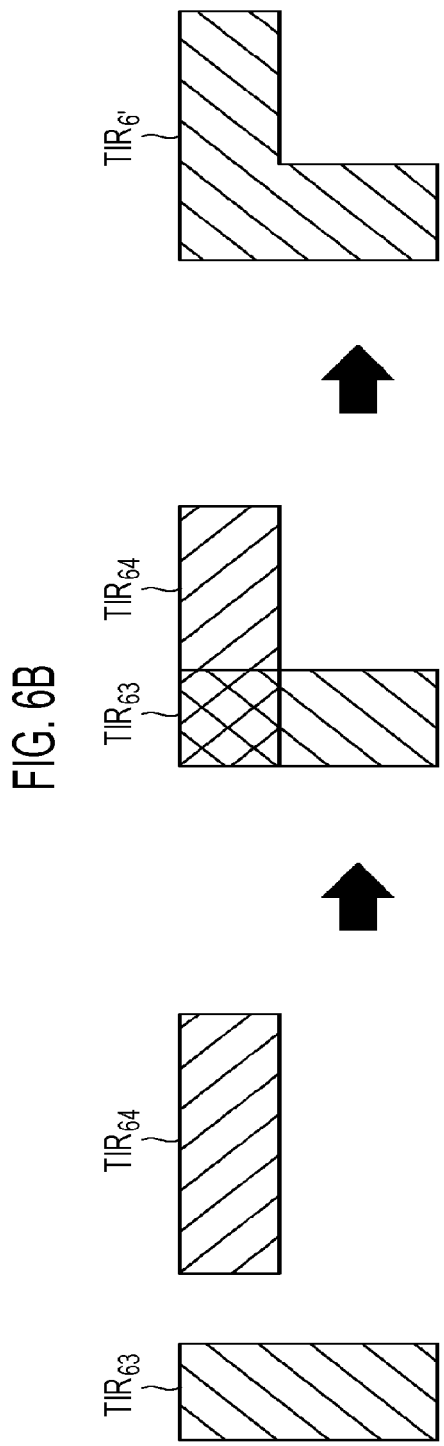

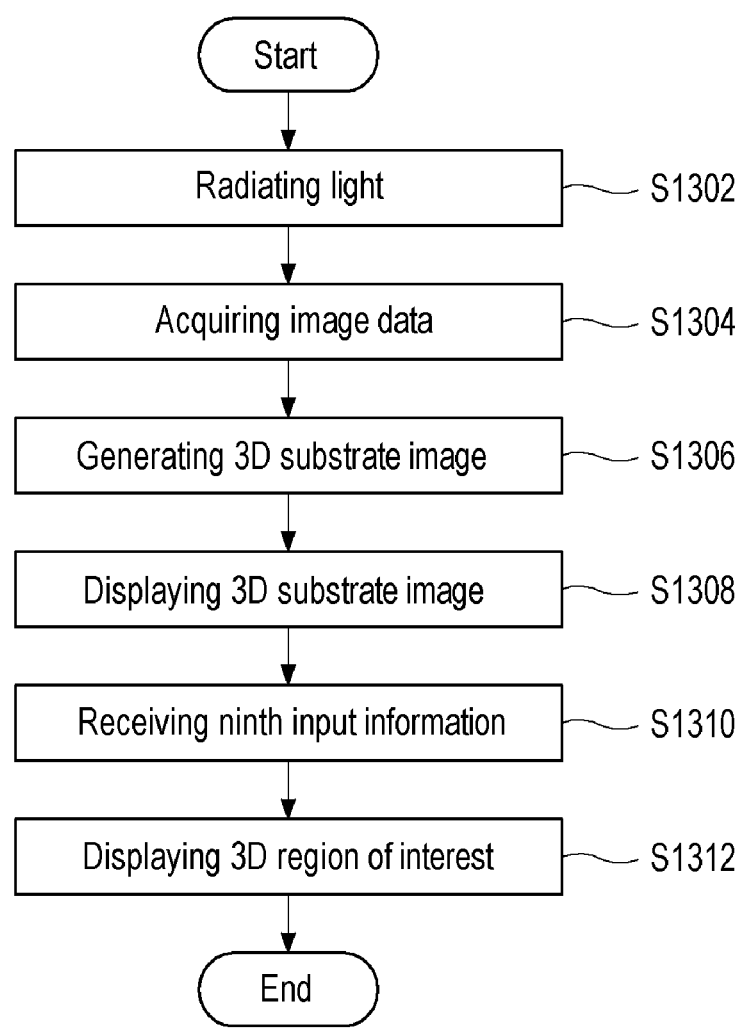

FIG. 17
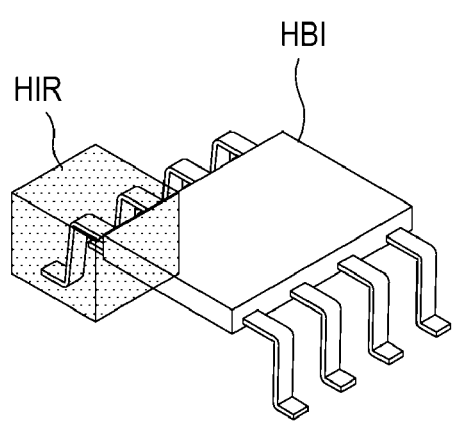
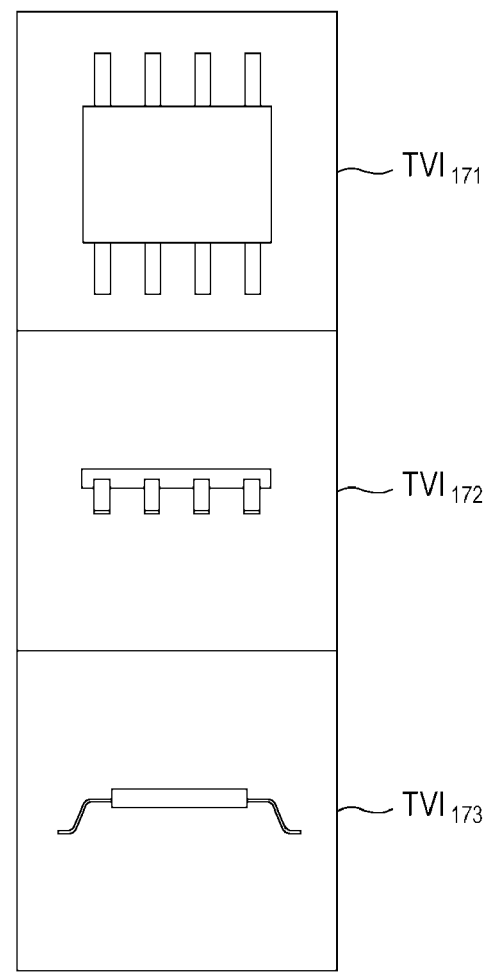

FIG. 18
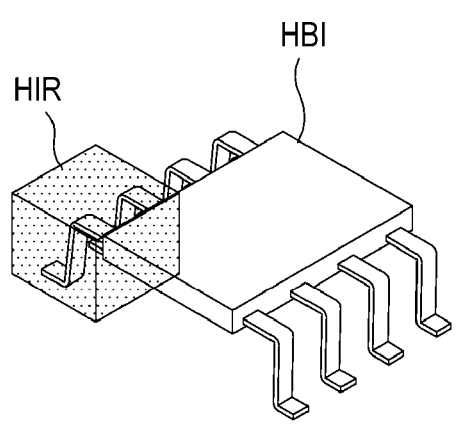
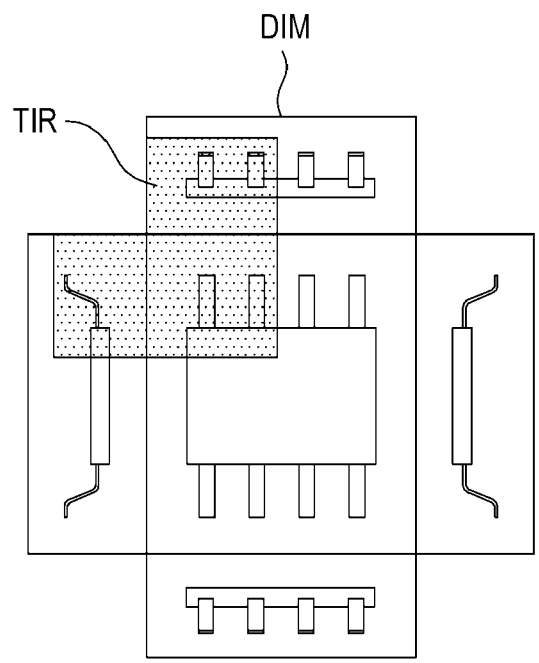

SUBSTRATE INSPECTION METHOD AND SYSTEM

TECHNICAL FIELD

The present disclosure relates to the field of substrate inspection technology, and more particularly to a method and a system for inspecting a substrate capable of determining whether the substrate is good or not good by inspecting an application state of leads and a mounting state of electronic components on the surface of a printed circuit board (PCB) used as a circuit of an electronic device.

BACKGROUND ART

In order to verify the reliability of a substrate on which electronic components are mounted, it is generally necessary to inspect whether the substrate is properly manufactured before and after the electronic components are mounted thereon. For example, it is necessary to inspect whether leads are properly applied on pad regions of the substrate before the electronic components are mounted on the substrate or whether the electronic components are properly mounted after the electronic components are mounted on the substrate.

Recently, in order to precisely measure inspection objects (for example, electronic components or the like) mounted on the substrate, technology for measuring a 3D shape of an inspection object by using a substrate inspection apparatus, which includes at least one illumination part configured to radiate a pattern light on the inspection object and a camera configured to acquire image data by photographing an image of the inspection object through the irradiation of the pattern light, has been used.

The substrate inspection apparatus generates an image of the substrate based on image data, sets a predetermined region of interest (ROI) on the image of the substrate, and inspects whether the inspection object is properly formed within the region of interest.

In the prior art, the region of interest is fixed to a particular shape, for example, a rectangle. Accordingly, when a plurality of regions of interest is set on the image of the substrate, a new region of interest cannot be set by combining a region of interest with the previously set region of interest, and must be set by newly adding a region of interest. Meanwhile, as the shapes of electronic components mounted on the substrate become more diverse, it is necessary to set the region of interest having arbitrary shape on the image of the substrate, and it is also necessary to set a 3D region of interest on a 3D image of the substrate.

In the prior art, it is determined whether the inspection object of the substrate is good or not good (non-defective or defective), based on an inspection condition for one view. Accordingly, in order to determine whether the substrate is good or not good, there is a case where image data even for the same inspection object are acquired several times and the inspection object is inspected. As a result, it takes a longer time to inspect the substrate.

SUMMARY

The present disclosure provides a substrate inspection method and system for setting a region of interest having various shapes, such as an arbitrary 2D shape and/or 3D shape, as a region of interest on an image of the substrate in order to determine whether the substrate is good or not good by inspecting an application state of a lead on the substrate or a mounting state of electronic components on the substrate.

Further, the present disclosure provides a substrate inspection method and system for determining whether an inspection object is good or not good by using view data (that is, a view image) corresponding to each of a plurality of views based on an inspection condition for each of the plurality of views and determining whether the substrate is good or not good according to the result of determining whether the inspection object is good or not good.

In accordance with an aspect of the present disclosure, a method of inspecting a substrate is provided. The method includes: generating and displaying a 2D image of a substrate based on image data acquired from the substrate having an inspection object; receiving first input information including arbitrary point data or line data for setting a region of interest at a plurality of particular positions of the 2D image from a user; and displaying the region of interest corresponding to the point data or the line data as a 2D region of interest having an arbitrary shape in accordance with the first input information.

In accordance with another aspect of the present disclosure, a system for inspecting a substrate is provided. The system includes: a processor configured to generate a 2D image of the substrate based on image data acquired from the substrate including an inspection object; a display part configured to display the 2D image; and a user input part configured to receive first input information including arbitrary point data or line data for setting a region of interest at a plurality of particular positions of the 2D image from a user, wherein the processor is further configured to display the region of interest corresponding to the point data or the line data as a 2D region of interest having an arbitrary shape in accordance with the first input information.

In accordance with another aspect of the present disclosure, a method of inspecting a substrate is provided. The method includes: generating and displaying a 3D image of the substrate based on image data acquired from the substrate having an inspection object; receiving input information corresponding to a region of interest in a 3D shape having a bottom and a height at a predetermined position of the 3D image from a user; and displaying the region of interest as a 3D region of interest having a 3D shape in accordance with the input information.

In accordance with another aspect of the present disclosure, a system for inspecting a substrate is provided. The system includes: a processor configured to generate a 3D image of the substrate based on image data acquired from the substrate having an inspection object; a display part configured to display the 3D image; and a user input part configured to receive input information corresponding to a region of interest in a 3D shape having a bottom and a height at a predetermined position of the 3D image, from a user, wherein the processor is further configured to display the region of interest as a 3D region of interest in a 3D shape in accordance with the input information.

The present disclosure can set a region of interest in various shapes according to a shape of an inspection object since the region of interest can be set on a 2D image of the substrate in an arbitrary 2D shape.

The present disclosure can increase user's convenience in setting the region of interest since two regions of interest set on the 2D image of the substrate can be reset as one 2D region of interest and a 2D region of interest can be divided as at least two 2D regions of interest.

The present disclosure can provide a 3D image of the substrate along with a 2D image of the substrate, and set a 3D region of interest in a 3D shape on the 3D image based on a 2D region of interest set on the 2D image.

The present disclosure can three-dimensionally inspect the inspection object of the substrate since a region of interest can be three-dimensionally set on the 3D image of the substrate.

The present disclosure can provide a 2D image of the substrate along with a 3D image of the substrate and set a 2D region of interest in an arbitrary shape on the 2D image based on a 3D region of interest set on the 3D image.

The present disclosure can not only reduce a substrate inspection time but also increase the accuracy of the substrate inspection since it is determined whether the inspection object is good or not good in a substrate image for each of a plurality of views based on inspection conditions for each of the plurality of views.

BRIEF DESCRIPTION OF THE DRAWINGS

FIGS. 6A and 6B are diagrams illustrating examples of resetting at least two 2D regions of interest (combination of the 2D regions of interest) set on a substrate image according to the first embodiment of the present disclosure;

FIG. 13 is a flowchart illustrating a process of setting a region of interest according to a second embodiment of the present disclosure;

FIG. 17 illustrates an example of a 3D substrate image and a 2D view image according to the third embodiment of the present disclosure;

FIG. 18 is a diagram illustrating an example of displaying a 3D region of interest and a 2D region of interest according to the third embodiment of the present disclosure;

DETAILED DESCRIPTION

Hereinafter, embodiments of the present disclosure will be described with reference to the accompanying drawings. However, if it is deemed that there is a possibility of making the essentials of the present disclosure unnecessarily unclear in the following description, a detailed description of a widely known function or configuration will be omitted.

First Embodiment

Figure 1:
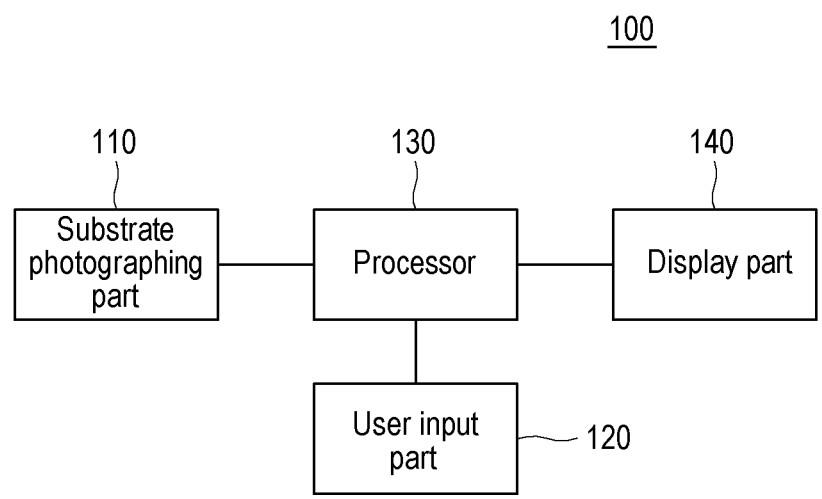
FIG. 1 is a block diagram schematically illustrating the configuration of a substrate inspection system according to a first embodiment of the present disclosure.

FIG. 1 is a block diagram schematically illustrating a configuration of a substrate inspection system according to a first embodiment of the present disclosure. Referring to FIG. 1, the substrate inspection system 100 according to the present embodiment includes a substrate photographing part 110.

The substrate photographing part 110 is configured to radiate a light to a substrate including an inspection object, and receive the light reflected from the substrate, so as to acquire image data corresponding to the inspection object on the substrate. The substrate includes a printed circuit board (PCB) on which conductive wires and pads are formed. However, it may not be limited thereto.

Figure 2:
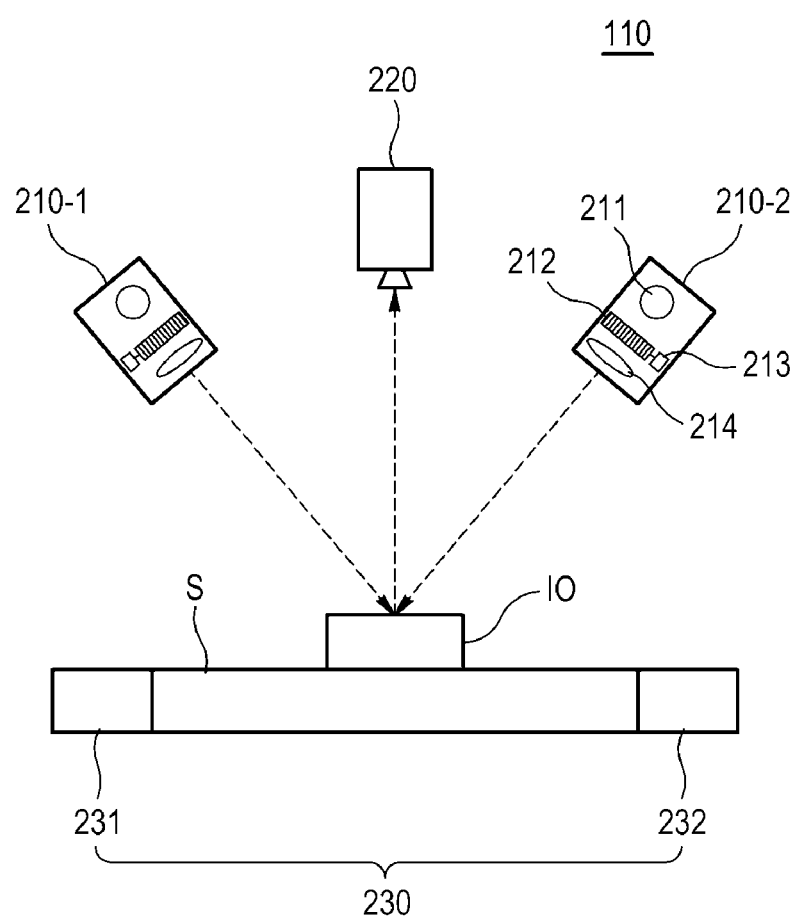
FIG. 2 is a diagram schematically illustrating a substrate photographing part of FIG. 1.

FIG. 2 is a diagram schematically illustrating the substrate photographing part 110 according to an embodiment of the present disclosure. Referring to FIG. 2, the substrate photographing part 110 includes projection portions 210-1 and 210-2.

The projection portions 210-1 and 210-2 are configured to radiate a pattern light to the substrate S in order to measure a shape of the inspection object formed on the substrate S.

The inspection object IO includes a solder (not shown) formed on the pad and electronic components (not shown) mounted on the substrate S. However, it may not be limited thereto.

According to an embodiment, the projection portions 210-1 and 210-2 include a light source 211 configured to generate a light, a grating device 212 configured to convert the light from the light source 211 into a pattern light, a grating transfer device 213 configured to pitch-transfer the grating device 212, and a projection lens 214 configured to project the pattern light converted by the grating device 212 on the inspection object IO. Here, for phase transition of the pattern light, the grating device 212 may be transferred by a predetermined distance (for example, $2\pi/N$ (N is a natural number larger than or equal to 2) through the grating transfer part 213 such as a PZT (piezo) actuator. Unlike this, a grating pattern light of which the phase is transitioned using an image of a liquid crystal display device may be radiated instead of using the grating device 212 and the grating transfer part 213. However, the present disclosure is not necessarily limited thereto, and can be implemented by other means as long as the grating pattern light, the phase of which is transitioned, can be radiated.

A projection portion may be installed or a plurality of projection portions 210-1 and 210-2 may be installed separately from each other at regular angles in a circumferential direction. The projection portions 210-1 and 210-2 are installed at an incline at a predetermined angle relative to the substrate S and are configured to radiate the pattern light on the substrate S from a plurality of directions.

The substrate photographing part 110 further includes an imaging portion 220. The imaging portion 220 is configured to acquire the image data corresponding to the substrate S by receiving the light, which is radiated from the projection portions 210-1 and 210-2 and reflected from the substrate S. That is, the imaging portion 220 is configured to acquire the image data corresponding to the substrate S by photographing the substrate S through the radiated pattern light of the projection portions 210-1 and 210-2. In one example, the imaging portion 220 may be installed on an upper position perpendicular to the substrate S. In another example, a plurality of imaging portions 220 may be installed at an upper position perpendicular to the substrate S, and at positions, which are separated at a predetermined angle in a circumferential direction and are below the upper position. The imaging portion 220 includes a charge-coupled device (CCD) camera or a complementary metal oxide semiconductor (CMOS) camera. However, it may not be limited thereto.

The substrate photographing part 110 further includes a stage 230. The stage 230 is configured to support and fix the substrate S. According to an embodiment, the stage 230 includes a first stage 231 configured to support and fix one end of the substrate S and a second stage 232 configured to support and fix the other end of the substrate S. The substrate photographing part 110 illustrated in FIG. 2 is only one embodiment of a substrate inspection device that may acquire image data corresponding to the substrate S, and accordingly, it should be noted that the substrate photographing part 110 is not necessarily limited to the shape illustrated in FIG. 2.

Referring back to FIG. 1, the substrate inspection system 100 further includes a user input part 120. The user input part 120 receives input information for setting a region of interest (ROI) on an image corresponding to the substrate S (hereinafter, referred to as a "substrate image") from the user. The input information and the region of interest will be described below in more detail. The user input part 120 includes a keyboard, a mouse, a touch screen, and the like. However, it may not be limited thereto, and may be any device capable of receiving the input information from the user.

The substrate inspection system 100 further includes a processor 130. The processor 130 is configured to generate a substrate image based on the image data provided from the substrate photographing part 110. According to an embodiment, the substrate image includes a 2D image or a 3D image. According to an embodiment, the substrate image may be an image corresponding to the entire substrate S, a part of the substrate S, or one inspection object IO. Further, the processor 130 is configured to display the region of interest for the substrate image on a display part 140 based on the input information provided from the user input part 120. In addition, the processor 130 is configured to perform the measurement for the region of interest set on the substrate image.

The processor 130 is electrically connected to the substrate photographing part 110, the user input part 120, and the display part 140, and controls the operation of each element of the substrate inspection system 100, that is, the substrate photographing part 110, the user input part 120, and the display part 140.

The substrate inspection system 100 further includes the display part 140. The display part 140 is configured to two-dimensionally or three-dimensionally display the substrate image generated by the processor 130. Further, the display part 140 is configured to two-dimensionally or three-dimensionally display the region of interest set on the substrate image. The display part 140 may include a liquid crystal display (LCD), a touch screen, or the like. However, it may not be limited thereto.

Hereinafter, an embodiment for setting the region of interest on the substrate image will be described with reference to the accompanying drawings.

Figure 3:
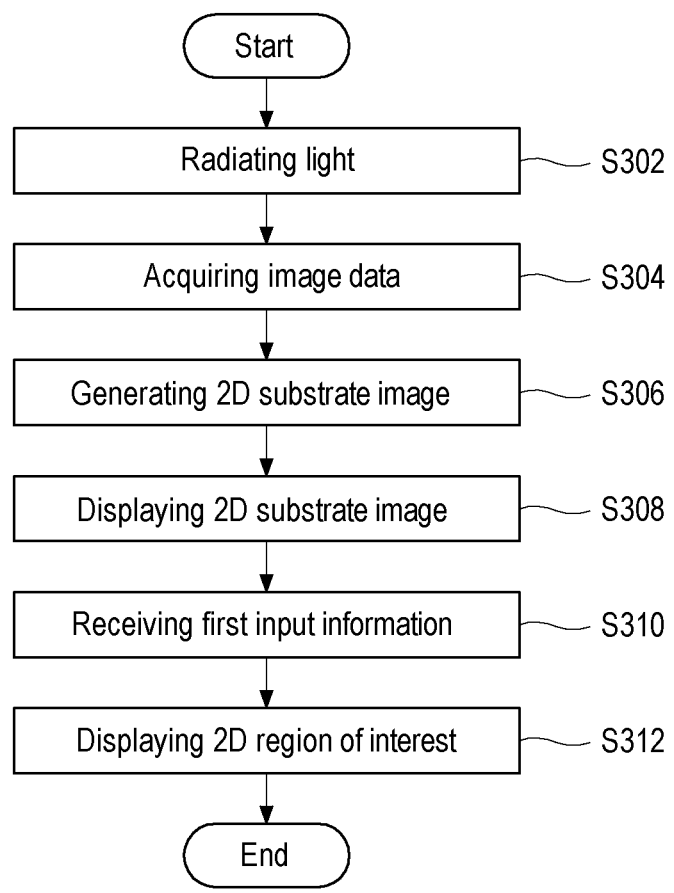
FIG. 3 is a flowchart illustrating a process of setting a region of interest according to the first embodiment of the present disclosure.

FIG. 3 is a flowchart illustrating a process of setting a region of interest according to the first embodiment of the present disclosure. Referring to FIG. 3, the substrate photographing part 110 is configured to generate a light for acquiring a substrate image and radiate the light on the substrate S in S302. Further, the substrate photographing part 110 is configured to receive the light reflected from the substrate S and acquire image data of the substrate S in S304.

The processor 130 is configured to generate a substrate image based on the image data provided from the substrate photographing part 110 in S306. The substrate image in the present embodiment corresponds to a 2D substrate image. The 2D substrate image generated by the processor 130 is displayed on the display part 140 in S308.

When input information (hereinafter, referred to as "first input information") for setting the region of interest at a plurality of particular positions in the 2D substrate image is received through the user input part 120 in S310, the processor 130 is configured to two-dimensionally display the region of interest in a predetermined shape in accordance with the first input information in S312.

Figure 4:
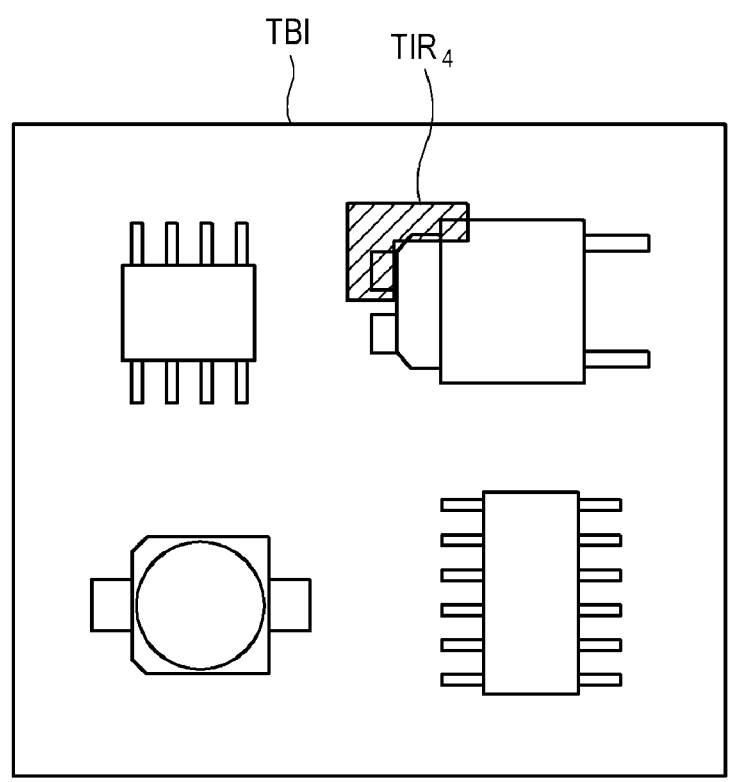
FIG. 4 illustrates an example of a region of interest according to the first embodiment of the present disclosure.

According to an embodiment, the first input information includes predetermined point data. For example, when the first input information corresponding to arbitrary point data for setting the region of interest at a plurality of particular positions in the 2D substrate image is received, the processor 130 is configured to generate the region of interest having an arbitrary 2D shape (hereinafter, referred to as a "2D region of interest") by connecting the point data with a line in accordance with the first input information. Further, the processor 130 is configured to display the 2D region of interest TIR4 on the display part 140 (see FIG. 4). In FIG. 4, the reference character "TBI" indicates the 2D substrate image. Here, as an example in which the 2D region of interest is generated by connecting the point data with the line, the 2D region of interest having an arbitrary shape (for example, a polygon, a circle, or the like) may be generated in a manner such that the points are sequentially connected in the order of dotting on the 2D substrate image and such that the last point is connected to the initial point.

According to another embodiment, the first input information includes line data. For example, when the first input information corresponding to arbitrary line data for setting the region of interest at a plurality of particular positions in the 2D substrate image is received, the processor 130 is configured to generate the 2D region of interest by connecting line data in accordance with the first input information. Further, the processor 130 is configured to display the 2D region of interest on the display 140 so that the 2D region of interest is displayed at the corresponding position of the 2D substrate image. Here, as an example of generating the 2D region of interest by connecting the line data, the 2D region of interest having an arbitrary shape, which includes lines, is generated on the 2D substrate image, but when the lines are not connected (partially open type), the 2D region of interest may be automatically completed by connecting open ends of the lines, which are connected, to each other.

Although it has been described that one 2D region of interest is displayed on the 2D substrate image in the above-described example, it may not be limited thereto, and a plurality of 2D regions of interest may be displayed on the 2D substrate image.

As described above, according to the present embodiment, since the region of interest for the 2D substrate image may be set in an arbitrary 2D shape, the 2D inspection can be implemented by setting the region of interest according to the shape of the inspection object included in the substrate.

Figure 5:
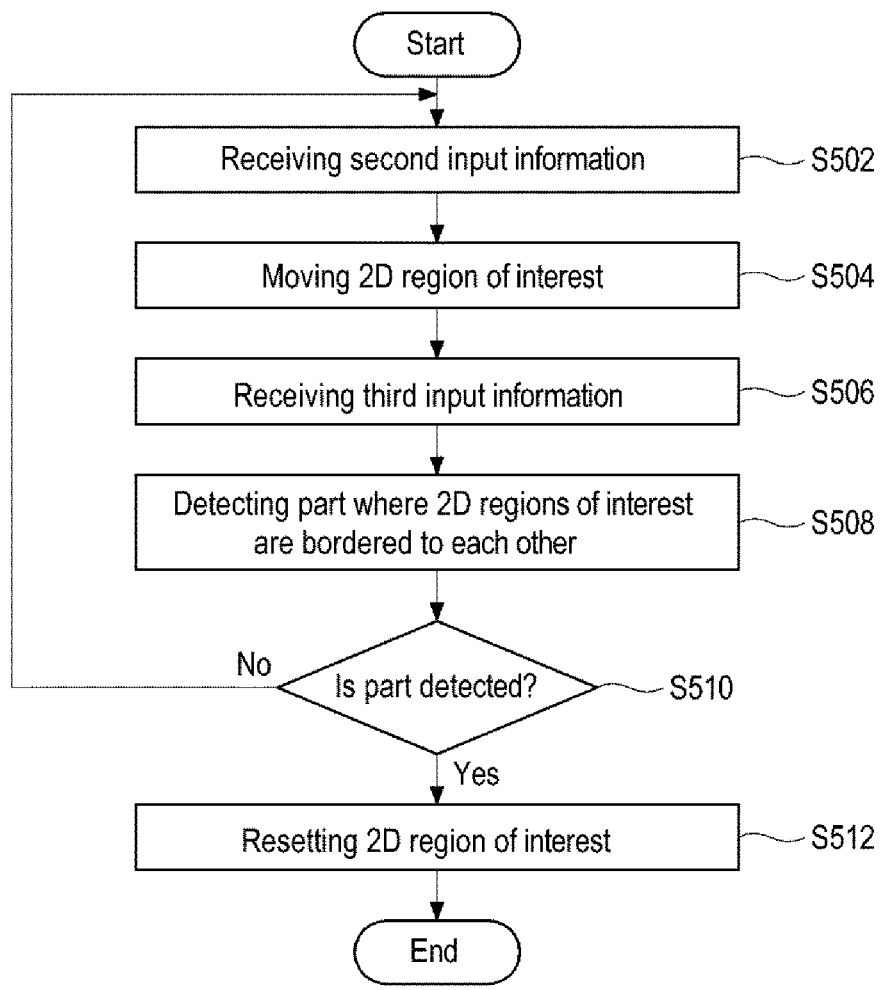
FIG. 5 is a flowchart illustrating a process of resetting at least two 2D regions of interest (combination of the 2D regions of interest) set on a substrate image according to the first embodiment of the present disclosure.

FIG. 5 is a flowchart illustrating a process of resetting at least two 2D regions of interest (combination of the 2D regions of interest) set on the substrate image according to the first embodiment of the present disclosure. Referring to FIG. 5, when input information for selecting and dragging one of the at least two 2D regions of interest set on the substrate image (hereinafter, referred to as "second input information") is received through the user input part 120 in S502, the processor 130 is configured to move the corresponding 2D region of interest in accordance with the second input information, and to display the 2D region of interest on the display part 140 in S504.

Subsequently, when input information (hereinafter, referred to as "third input information") for resetting the at least two 2D regions of interest is received through the user input part 120 in S506, the processor 130 is configured to detect a part where the at least two 2D regions of interest border each other in accordance with the third input information in S508. Since the part where the 2D regions of interest border each other can be detected through various known methods, this technology is not described in detail in the present embodiment. When the part where the at least two 2D regions of interest border each other is detected ("Yes" in S510), the processor 130 is configured to reset a 2D region of interest by combining the at least two 2D regions of interest based on the detected part in S512.

For example, as illustrated in FIG. 6A, the processor 130 is configured to detect a part where a 2D region of interest TIR61 and a 2D region of interest TIR62 border each other. Further, the processor 130 is configured to reset a 2D region of interest TIR6 by combining the 2D region of interest TIR61 and the 2D region of interest TIR62 based on the detected part. That is, in FIG. 6A, the 2D regions of interest TIR61 and TIR62 border each other.

In another example, as illustrated in FIG. 6B, the processor 130 is configured to detect a part where a 2D region of interest TIR63 and a 2D region of interest TIR64 border each other. Further, the processor 130 is configured to reset a 2D region of interest TIR6' by combining the 2D region of interest TIR63 and the 2D region of interest TIR64 based on the detected part. In FIG. 6, the regions of interest TIR63 and TIR64 overlap with each other.

Meanwhile, when the part where the at least two 2D regions of interest border each other is not detected ("No" in S510), the steps S502 to S508 are performed again.

Figure 7:
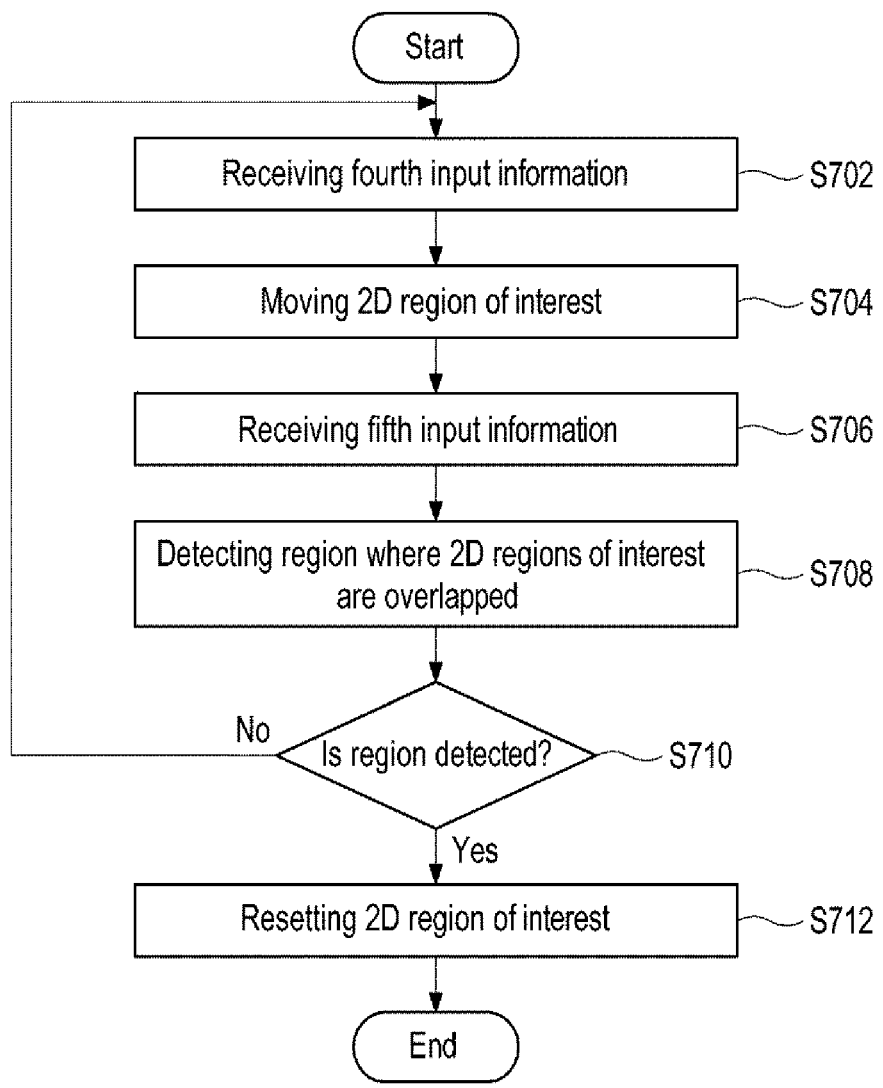
FIG. 7 is a flowchart illustrating a process of resetting at least two 2D regions of interest (removal of the 2D regions of interest) set on a substrate image according to the first embodiment of the present disclosure.

FIG. 7 is a flowchart illustrating a process of resetting at least two 2D regions of interest (combination of the 2D regions of interest) set on the substrate image as one 2D region of interest according to the first embodiment of the present disclosure. Referring to FIG. 7, when input information (hereinafter, referred to as "fourth input information") for selecting and dragging one of at least two 2D regions of interest set on the substrate image is received through the user input part 120 in S702, the processor 130 is configured to move the corresponding 2D region of interest in accordance with the fourth input information, and display the corresponding 2D region of interest on the display part 140 in S704.

Subsequently, when input information (hereinafter, referred to as "fifth input information") for making a request for resetting the at least two 2D regions of interest is received through the user input part 120 in S706, the processor 130 is configured to detect a region where the at least two 2D regions of interest overlap with each other in accordance with the fifth input information in S708. When the 2D region of interest corresponding to the fourth input information is a "first 2D region of interest" and the other 2D region of interest between the two 2D regions of interest is a "second 2D region of interest", the fifth information corresponds to input information for removing a region of the second 2D region of interest that overlaps with the first 2D region of interest.

When a region where the first 2D region of interest and the second 2D region of interest overlap with each other is detected ("Yes" in S710), the processor 130 is configured to remove the region corresponding to the first 2D region of interest from the second 2D region of interest based on the detected region, and reset the first and second 2D regions of interest as one 2D region of interest in S712.

Figure 8:
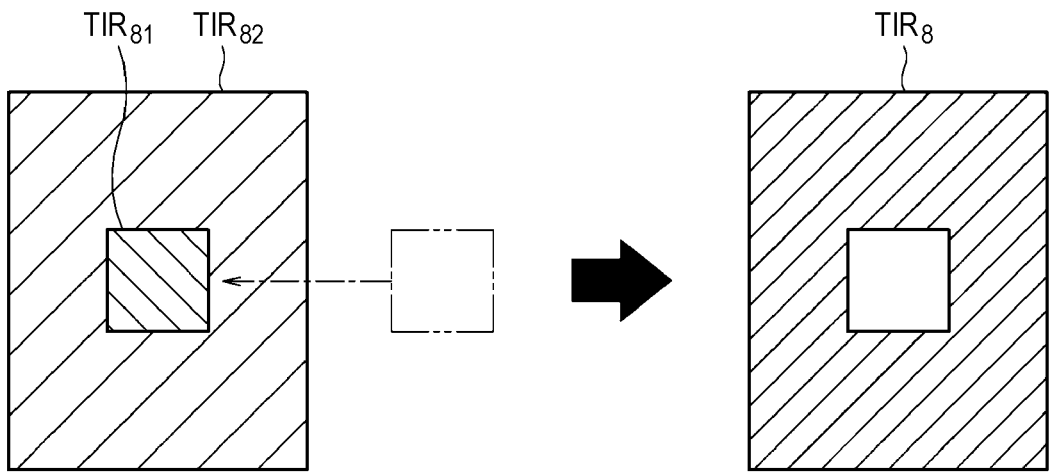
FIG. 8 is a diagram illustrating an example of resetting at least two 2D regions of interest (removal of the 2D regions of interest) set on a substrate image according to the first embodiment of the present disclosure.

For example, as illustrated in FIG. 8, the processor 130 is configured to detect a region where a first 2D region of interest TIR$_{81}$ and a second 2D region of interest TIR$_{82}$ overlap with each other. Further, the processor 130 is configured to remove the region corresponding to the first 2D region of interest TIR$_{81}$ from the second 2D region of interest TIR$_{82}$ based on the detected region, so as to reset the first and second 2D regions of interest TIR$_{81}$ and TIR$_{82}$ as one 2D region of interest TIR$_{8}$.

Meanwhile, when no region where the first 2D region of interest and the second 2D region of interest overlap with each other is detected ("No" in S710), the step S702 to the step S708 are performed again.

Figure 9:
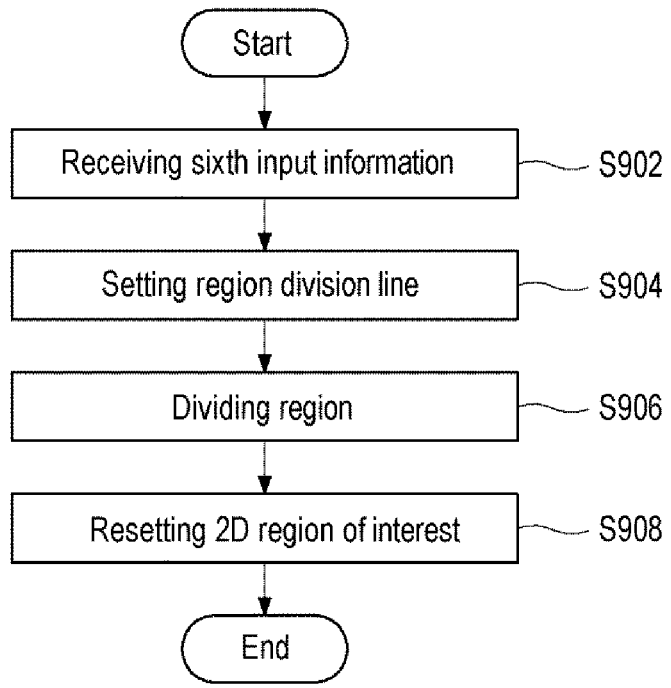
FIG. 9 is a flowchart illustrating a process of resetting 2D regions of interest (division of the 2D region of interest) set on a substrate image according to the first embodiment of the present disclosure.

FIG. 9 is a flowchart illustrating a process of resetting a 2D region of interest (division of the 2D region of interest) set on the substrate image according to the first embodiment of the present disclosure, wherein the 2D region of interest is reset by dividing one 2D region of interest into at least two regions.

Figure 10:
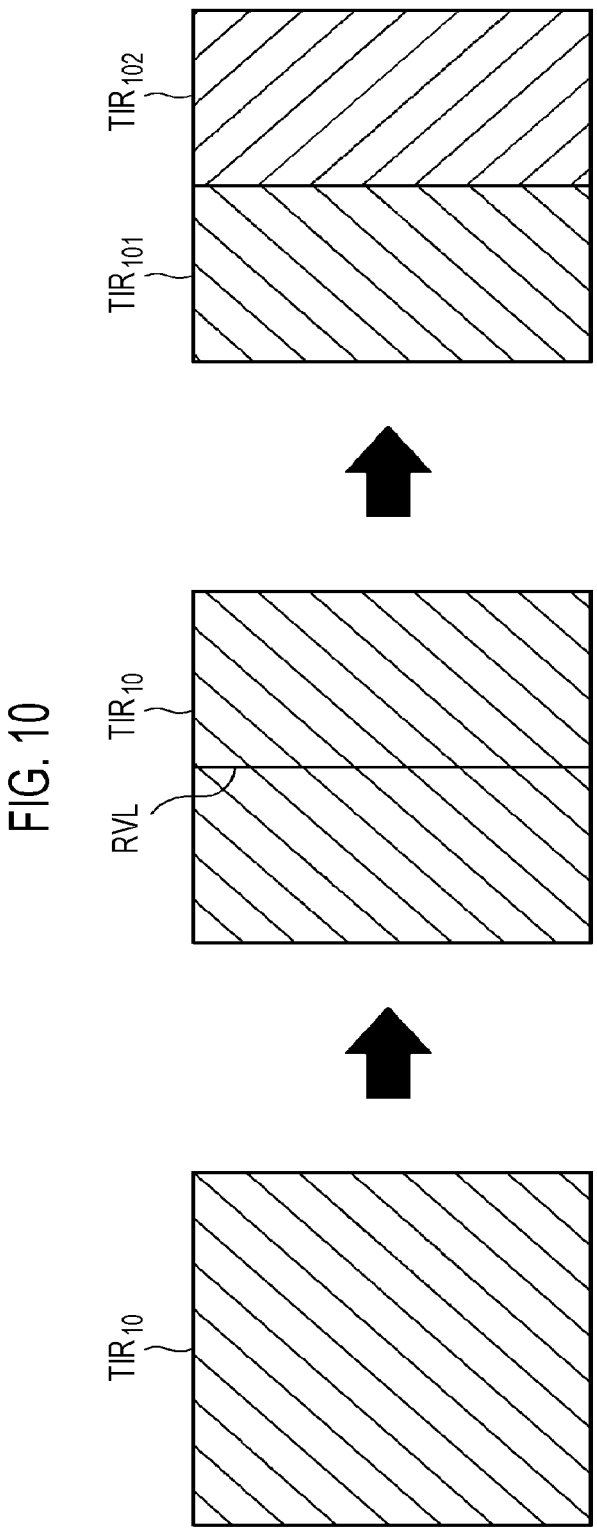
FIG. 10 is a diagram illustrating an example of resetting 2D regions of interest (division of the 2D region of interest) set on a substrate image according to the first embodiment of the present disclosure.

Referring to FIG. 9, when input information (hereinafter, referred to as "sixth input information") including arbitrary point data or line data at one or more particular positions in the 2D region of interest set on the substrate image is received through the user input part 120 in S902, the processor 130 is configured to set at least one division line (hereinafter, referred to as a "region division line") for dividing the 2D region of interest in accordance with the sixth input information in S904. For example, as illustrated in FIG. 10, the processor 130 is configured to set a region division line RVL on a 2D region of interest $TIR_{10}$ set on the substrate image in accordance with the sixth input information.

The processor 130 is configured to divide the 2D region of interest into at least two regions based on the set region division line in S906. Further, the processor 130 is configured to reset at least two 2D regions of interest based on the at least two regions in S908. For example, as illustrated in FIG. 10, the processor 130 is configured to reset two 2D regions of interest $TIR_{101}$ and $TIR_{102}$ by dividing the 2D region of interest $TIR_{10}$ into two regions based on the region division line RVL. Here, it should be noted that the division of the region may be uniform division or non-uniform division.

Although it has been described that one division line is set on the 2D region of interest and two 2D regions of interest are reset in the above-described example, the present disclosure is not necessarily limited thereto, and one or a plurality of region division lines may be set on the 2D region of interest, in which case two or more 2D regions of interest may be reset.

Figure 11:
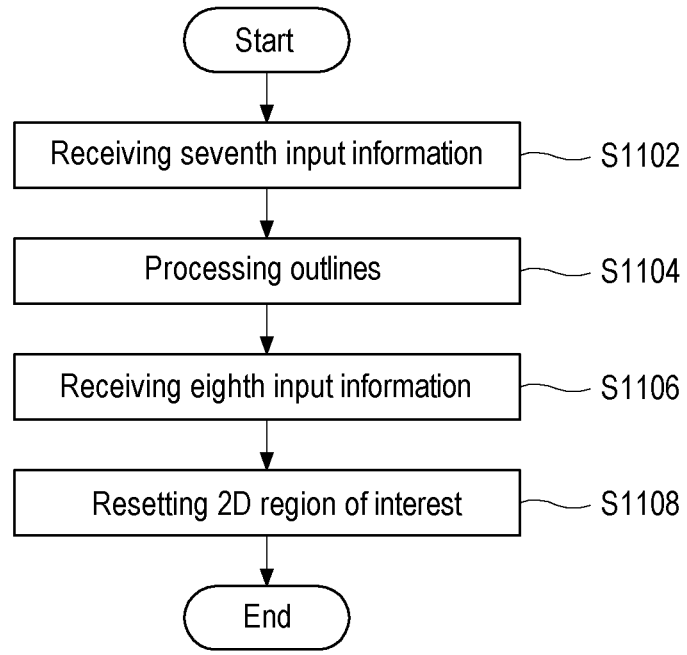
FIG. 11 is a flowchart illustrating a process of resetting a 2D region of interest by performing outline processing on at least two 2D regions of interest set on a substrate image according to the first embodiment of the present disclosure.

FIG. 11 is a flowchart illustrating a process of resetting a 2D region of interest by performing outline processing in at least two 2D regions of interest set on the substrate image according to the first embodiment of the present disclosure.

Referring to FIG. 11, when input information (hereinafter, referred to as "seventh input information") for making a request for outline processing of at least two 2D regions of interest set on the substrate image is received through the user input part 120 in S1102, the processor 130 is configured to perform the outline processing upon the at least two 2D regions of interest set on the substrate image in accordance with the seventh input information in S1104. Here, the outline processing corresponds to displaying only the outlines of the 2D regions of interest and making the inside of the 2D region of interest transparent. Various known methods may be used for the outline processing, and thus a detailed description thereof will be omitted.

Figure 12A:
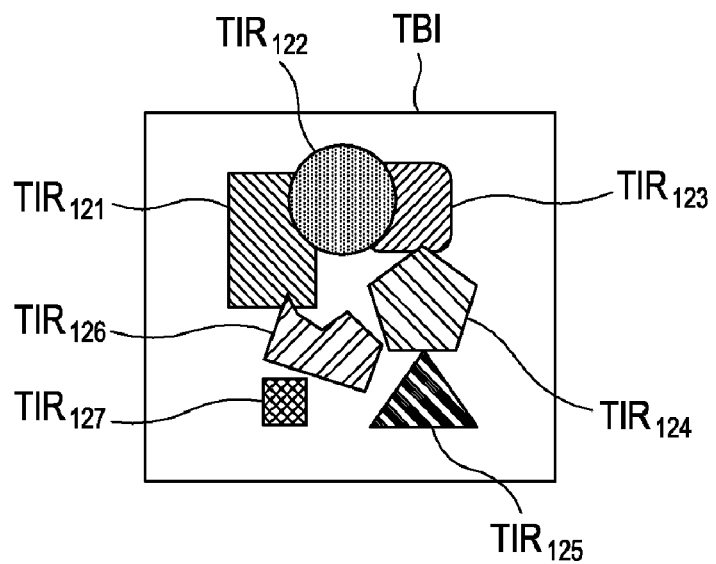
FIGS. 12A to 12C are diagrams illustrating examples of resetting a 2D region of interest by performing outline processing on at least two 2D regions of interest set on a substrate image according to the first embodiment of the present disclosure.
Figure 12B:
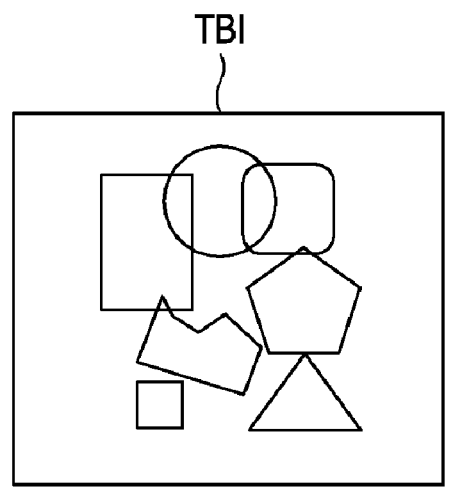
Figure 12C:
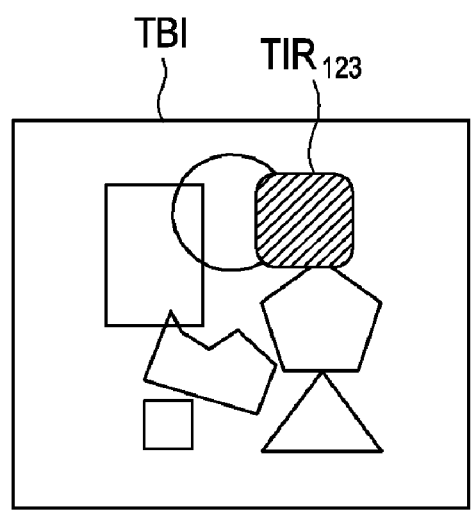

For example, the processor 130 is configured to perform the outline processing upon seven 2D regions of interest $TIR_{121}$ to $TIR_{127}$ (see FIG. 12A) set on a substrate image TBI in accordance with the seventh input information, and display the seven 2D regions of interest $TIR_{121}$ to $TIR_{127}$ on the display part 140 only with outlines (see FIG. 12B).

When input information (hereinafter, referred to as "eighth input information") for selecting at least one 2D region of interest from the at least two 2D regions of interest in which the outline processing has been performed is received through the user input part 120 in S1106, the processor 130 is configured to reset the at least one 2D region of interest selected from the at least two 2D regions of interest in which the outline processing has been performed as a new 2D region of interest in accordance with the eighth input information in S1108.

For example, the processor 130 is configured to reset a 2D region of interest TIR123 among the seven 2D regions of interest $TIR_{121}$ to $TIR_{127}$ in which the outline processing has been performed as a new 2D region of interest in accordance with the eighth input information.

Although it has been described that only one 2D region of interest is selected and reset as a new 2D region of interest in the above-described example, the present disclosure is not necessarily limited thereto, and a plurality of 2D regions of interest may be selected and reset as a new 2D region of interest.

Second Embodiment

Since elements of a substrate inspection system according to a second embodiment are the same as the elements of the substrate inspection system 100 according to the first embodiment, a detailed description thereof will be omitted in the present embodiment.

FIG. 13 is a flowchart illustrating a process of setting a region of interest according to the second embodiment of the present disclosure. Referring to FIG. 13, the substrate photographing part 110 is configured to generate a light for acquiring a substrate image, and radiate the light on a substrate S in S1302. Further, the substrate photographing part 110 is configured to acquire image data of the substrate S by receiving the light reflected from the substrate S in S1304.

The processor 130 is configured to generate a substrate image based on the image data provided from the substrate photographing part 110 in S1306. In the present embodiment, the substrate image is a 3D substrate image. The 3D substrate image generated by the processor 130 is displayed on the display part 140 in S1308.

When input information (hereinafter, referred to as "ninth input information") for setting a region of interest at a particular position of the 3D substrate image is received through the user input part 120 in S1310, the processor 130 is configured to three-dimensionally display the region of interest on the display part 140 in accordance with the ninth input information in S1312. That is, the processor 130 is configured to display a region of interest having a 3D shape (hereinafter, referred to as a 3D region of interest) on the display part 140 in accordance with the ninth input information. According to an embodiment, the ninth input information is input information corresponding to the region of interest of the 3D shape having a bottom and a height at a predetermined position of the 3D image.

Figure 14:
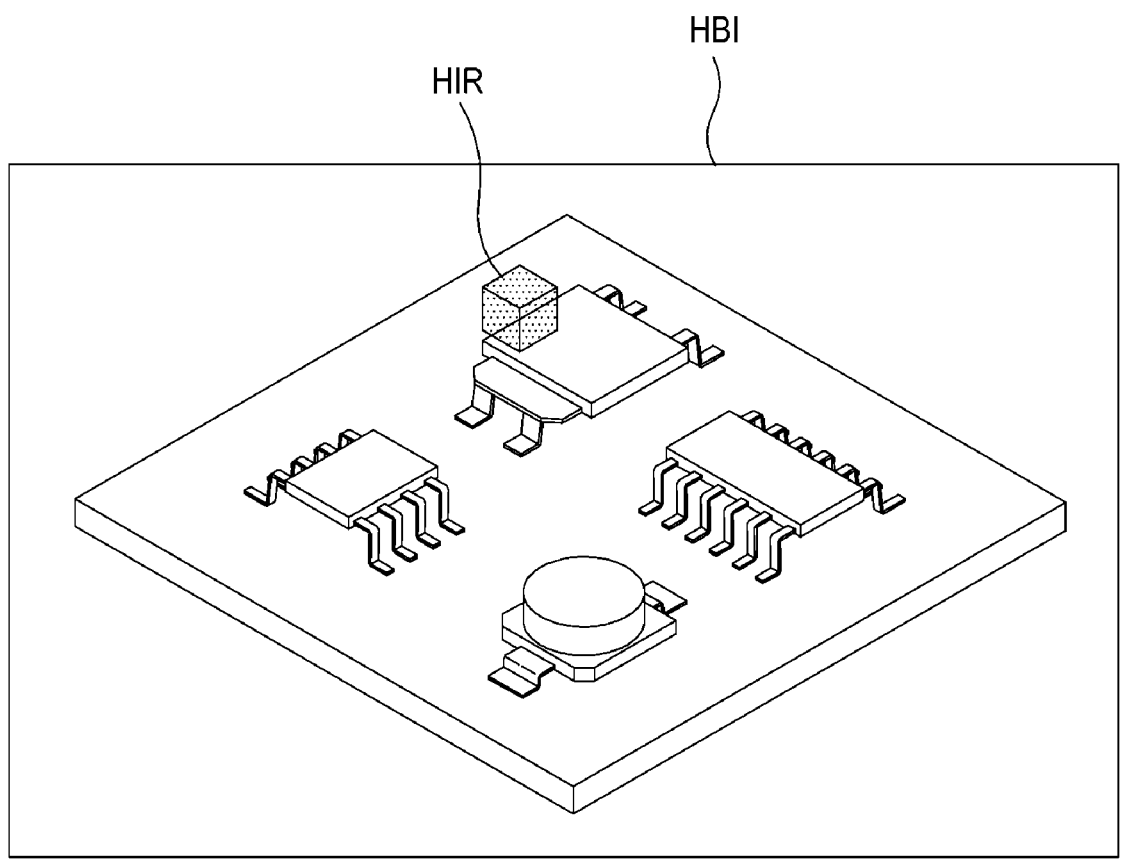
FIG. 14 illustrates an example of a region of interest according to the second embodiment of the present disclosure.

For example, the processor 130 is configured to display a 3D region of interest HIR of a 3D shape ("hexahedral shape" in this example) on the display part 140 based on the ninth input information received through the user input part 120, as illustrated in FIG. 14. In FIG. 14, reference characters "HBI" refer to the 3D substrate image.

Although it has been described that the shape of the 3D region of interest is the hexahedral shape in the above-described example, the present disclosure is not necessarily limited thereto, and the 3D region of interest may have various shapes, such as a cylindrical shape, a conical shape, or the like. Further, although it has been described that one 3D region of interest is set on the 3D substrate image in the above-described example, the present disclosure is not necessarily limited thereto, and at least two 3D regions of interest may be set.

Selectively, the processor 130 is configured to measure the height of the inspection object IO of the substrate S or a particular part (for example, a solder or the like) of the inspection object, based on the 3D region of interest set on the 3D substrate image to generate a height measurement value, and display the generated height measurement value on the display part 140. Since the height of the particular part can be measured using various known methods, a detailed description thereof will be omitted in the present embodiment.

Further, selectively, the processor 130 is configured to compare the height measurement value and a predetermined reference value. Here, the reference value is a reference value for determining whether the inspection object is good or not good. When it is determined that the height measurement value exceeds the reference value in the predetermined range based on a result of the comparison between the height measurement value and the reference value in the predetermined range, the processor 130 is configured to determine that the inspection object is not good.

Further, selectively, the substrate inspection system 100 further include a storage part (not shown) that stores a database of color values corresponding to height values of the inspection object, and the processor 130 is configured to search the storage part, match the color value corresponding to the height measurement value with the 3D region of interest, and display the 3D region of interest on the display part 140.

Third Embodiment

Since the elements of a substrate inspection system according to a third embodiment are the same as the elements of the substrate inspection system 100 according to the first embodiment, a detailed description thereof will be omitted in the present embodiment.

Figure 15:
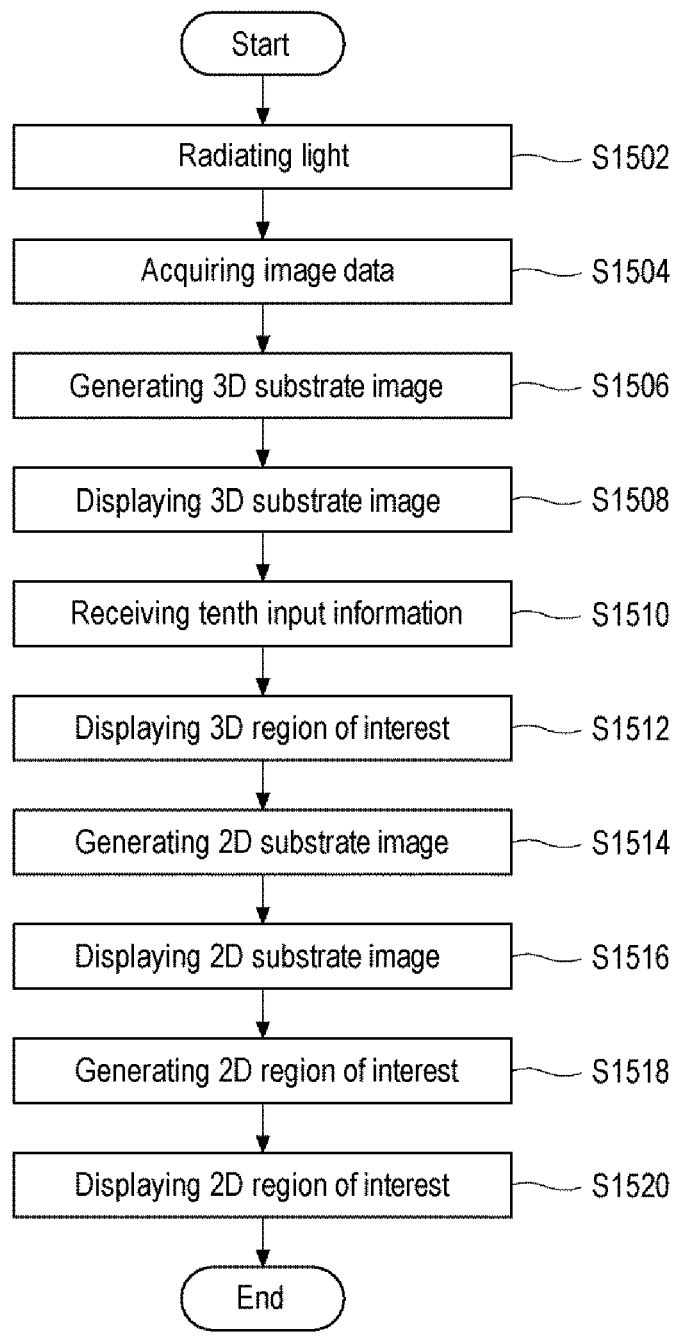
FIG. 15 is a flowchart illustrating a process of setting a region of interest according to a third embodiment of the present disclosure.

FIG. 15 is a flowchart illustrating a process of setting a region of interest according to the third embodiment of the present disclosure. Referring to FIG. 15, the substrate photographing part 110 is configured to generate light for acquiring a substrate image and radiate the light on a substrate S in S1502. Further, the substrate photographing part 110 is configured to receive the light reflected from the substrate S and acquire image data of the substrate S in S1504.

The processor 130 is configured to generate a 3D substrate image based on the image data provided from the substrate photographing part 110 in S1506. The 3D substrate image generated by the processor 130 is displayed on the display part 140 in S1508.

When input information (hereinafter, referred to as "tenth input information") for setting a region of interest at a particular position of the 3D substrate image is received through the user input part 120 in S1510, the processor 130 is configured to display a 3D region of interest in a 3D shape on the display part 140 in accordance with the tenth input information in S1512. The tenth input information is input information corresponding to a region of interest in a 3D shape having the bottom and the height at a particular position of the 3D substrate image.

When the 3D region of interest is displayed (set) on the 3D substrate image, the processor 130 is configured to generate a 2D substrate image based on the 3D substrate image and the 3D region of interest in S1514.

Figure 16:
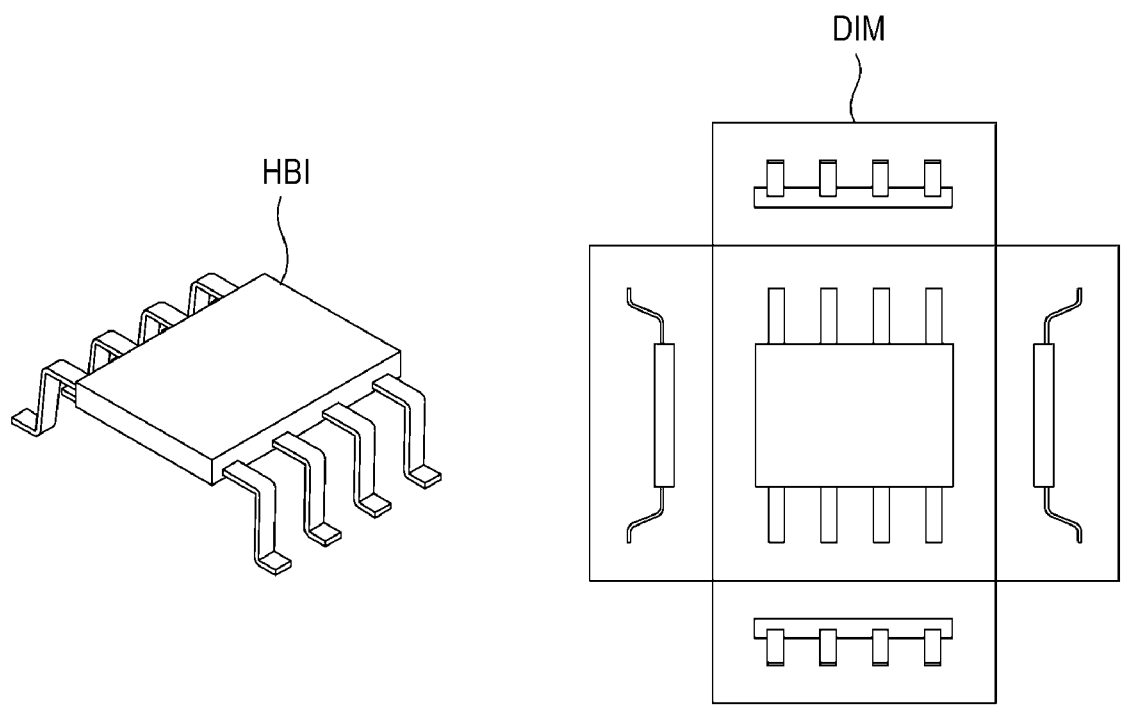
FIG. 16 illustrates an example of a 3D substrate image and a 2D development image according to the third embodiment of the present disclosure.

In an example, the 2D substrate image is an image (hereinafter, referred to as a "2D development image") that is two-dimensionally developed from the 3D substrate image. More specifically, the processor 130 is configured to generate a 2D development image DIM by two-dimensionally developing a 3D substrate image HBI, as illustrated in FIG. 16. At this time, the 2D development image DIM includes 2D images corresponding to the top surface and four lateral surfaces of the 3D substrate image HBI. That is, the 2D development image DIM does not include a 2D image corresponding to the bottom (that is, the surface which cannot be photographed by the substrate photographing part 110) of the 3D substrate image HBI.

In another example, the 2D substrate image is an image of a 2D view (hereinafter, referred to as a "2D view image") corresponding to the surface at which the 3D region of interest is located on the 3D substrate image. More specifically, the processor 130 is configured to detect a 3D position of the 3D region of interest in the 3D image based on geometrical position information of the 3D region of interest. The processor 130 is configured to set a plurality of 2D views based on the detected 3D position, and generate 2D view images $TVI_{171}$, $TVI_{172}$ and $TVI_{173}$ corresponding to the plurality of set 2D views, respectively (see FIG. 17). In FIG. 17, the 2D view image $TVI_{171}$ is an image corresponding to a top view, the 2D view image $TVI_{172}$ is an image corresponding to a left view, and the 2D view image $TVI_{173}$ is an image corresponding to a front view. The 2D view images may be changed depending on the position at which the 3D region of interest is set on the 3D substrate image.

Referring back to FIG. 15, the 2D substrate image generated by the processor 130 is displayed on the display part 140 in S1516. In an example, the 3D substrate image and the 2D substrate image are displayed on the display part 140 in leftward and rightward directions. In another example, the 3D substrate image and the 2D substrate image are displayed on the display part 140 in upward and downward directions.

Although it has been described that the 3D substrate image and the 2D development image are displayed on one display part in the above-described examples, the present disclosure is not necessarily limited thereto, and the 3D substrate image may be displayed on a first display part, and the 2D development image may be displayed on a second display part.

The processor 130 is configured to generate a 2D region of interest based on the 3D region of interest in S1518, and display the generated 2D region of interest on the 2D substrate image on the display part 140 in S1520. According to an embodiment, the processor 130 is configured to generate the 2D region of interest based on geometrical position information of the 3D region of interest set (displayed) on the 3D substrate image.

In an example, as illustrated in FIG. 18, the processor 130 is configured to generate a 2D region of interest TIR based on geometrical position information of a 3D region of interest HIR. Further, the processor 130 is configured to overlappingly display the 2D region of interest TIR at the corresponding position of a 2D development image DIM on the display part 140.

Figure 19:
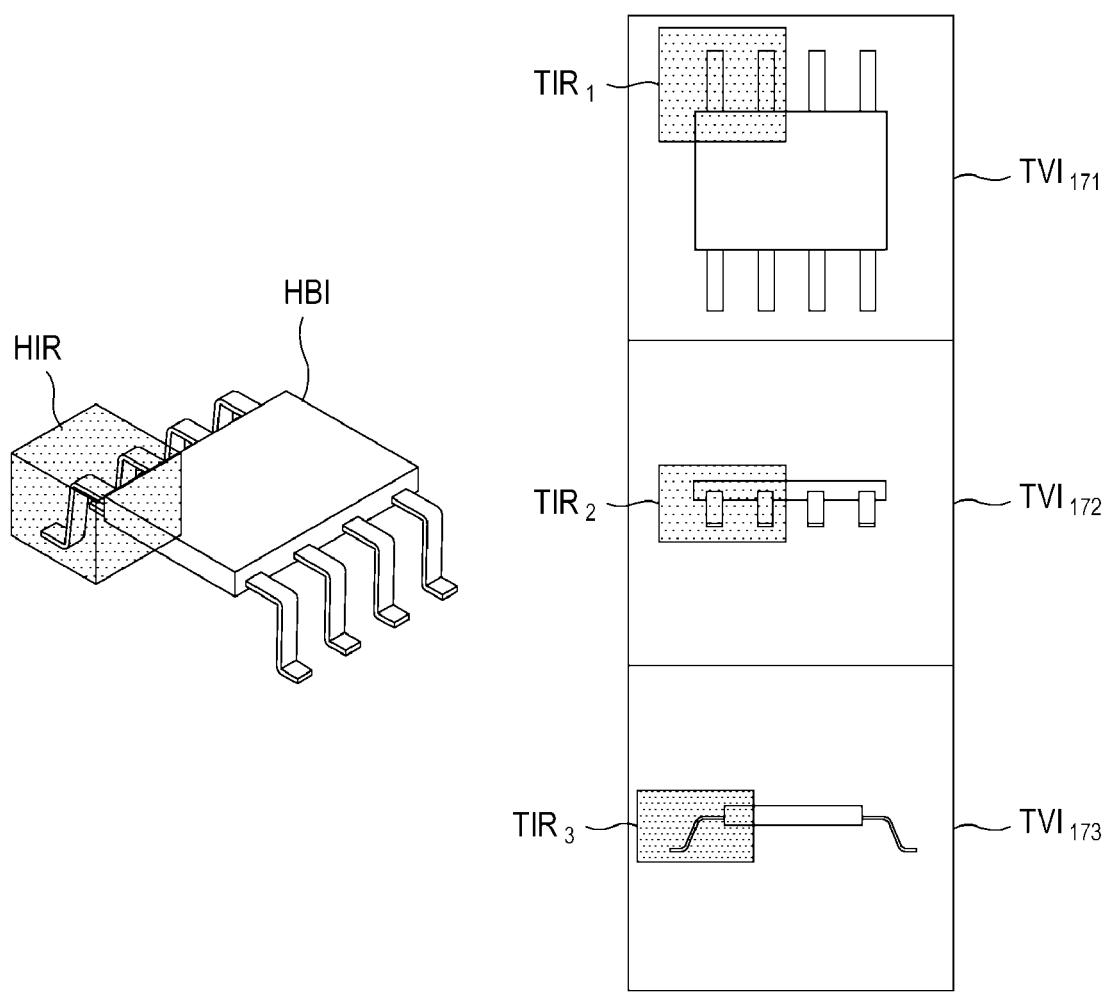
FIG. 19 is a diagram illustrating an example of displaying a 3D region of interest and a 2D region of interest according to the third embodiment of the present disclosure.

In another example, as illustrated in FIG. 19, the processor 130 is configured to generate 2D regions of interest $TIR_1$, $TIR_2$ and $TIR_3$ based on geometrical position information of a 3D region of interest HIR. Further, the processor 130 is configured to overlappingly display the 2D regions of interest $TIR_1$, $TIR_2$ and $TIR_3$ at the corresponding positions of 2D view images $TVI_{171}$, $TVI_{172}$ and $TVI_{173}$ on the display 140.

Selectively, the processor 130 is configured to measure the height of the inspection object on the substrate S or a particular part (for example, a solder or the like) of the inspection object based on the 3D region of interest set on the 3D substrate image to generate a height measurement value. Further, the processor 130 is configured to display the height measurement value on the display part 140. Since the height of the particular part can be measured using various known methods, a detailed description thereof will be omitted in the present embodiment.

Further, the processor 130 selectively compares the height measurement value and a reference value in a preset range. Here, the reference value is a reference value for determining whether the condition of the inspection object is good or not good. When it is determined that the height measurement value exceeds the reference value in the predetermined range based on a result of the comparison between the height measurement value and the reference value in the predetermined range, the processor 130 is configured to determine that the inspection object is not good.

Further, selectively, the substrate inspection system 100 further include a storage part (not shown) that stores a database of color values corresponding to height values of the inspection object, and the processor 130 is configured to search the storage part, match the color value corresponding to the height measurement value with the 3D region of interest, and display the 3D region of interest on the display part 140.

Fourth Embodiment

Since elements of a substrate inspection system according to a fourth embodiment are the same as the elements of the substrate inspection system 100 according to the first embodiment, a detailed description thereof will be omitted in the present embodiment.

Figure 20:
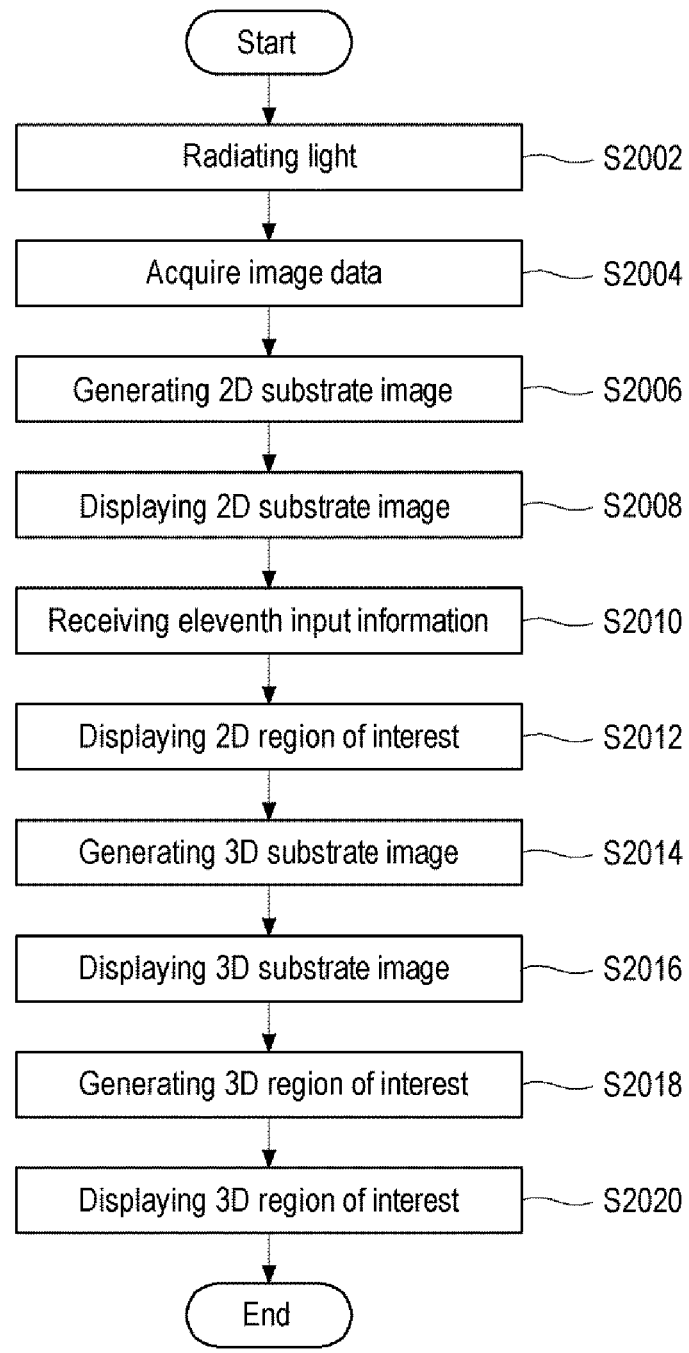
FIG. 20 is a flowchart illustrating a process of setting a region of interest according to a fourth embodiment of the present disclosure.

FIG. 20 is a flowchart illustrating a process of setting a region of interest according to the fourth embodiment of the present disclosure. Referring to FIG. 20, the substrate photographing part 110 is configured to generate a light for acquiring a substrate image, and radiate the light on a substrate S in S2002. Further, the substrate photographing part 110 is configured to receive the light reflected from the substrate S, and acquire image data of the substrate S in S2004.

The processor 130 is configured to generate a 2D substrate image based on the image data provided from the substrate photographing part 110 in S2006. The 2D substrate image generated by the processor 130 is displayed on the display part 140 in S2008.

In an example, the 2D substrate image corresponds to a 2D development image that is two-dimensionally developed from the 3D substrate image. More specifically, the processor 130 is configured to generate the 3D substrate image based on the image data, and generate the 2D development image by two-dimensionally developing the 3D substrate image.

In another example, the 2D substrate image is a 2D view image corresponding to each of a plurality of 2D views. Specifically, when input information for selecting a plurality of 2D views (for example, a top view, a front view, and a left view) for displaying the 2D region of interest is received from the user through the user input part 120, the processor 130 is configured to generate a 2D view image corresponding to each of the plurality of 2D views (the top view, the front view, and the left view) based on the image data.

When input information (hereinafter, referred to as "eleventh input information") for setting a region of interest at a plurality of particular positions of the 2D substrate image is received through the user input part 120 in S2010, the processor 130 is configured to display a 2D region of interest on the display part 140 in accordance with the eleventh input information in S2012. Since the eleventh input information in the present embodiment is the same as the first input information in the first embodiment, a detailed description thereof will be omitted.

In S2014, the processor 130 is configured to generate a 3D substrate image based on the image data acquired in S2004. For example, the processor 130 is configured to generate the 3D substrate image by applying a bucket algorithm on grating pattern images reflected from the inspection object on which a grating pattern light is radiated. The 3D substrate image generated by the processor 130 is displayed on the display part 140 in S2016. In an example, the 3D substrate image and the 2D substrate image are displayed on the display part 140 in leftward and rightward directions. In another example, the 3D substrate image and the 2D substrate image are displayed on the display part 140 in upward and downward directions.

Although it has been described that the 3D substrate image and the 2D substrate image are displayed on one display part in the above-described examples, the present disclosure is not necessarily limited thereto, and the 3D substrate image may displayed on a first display part and the 2D substrate image may be displayed on a second display part.

The processor 130 is configured to generate a 3D region of interest based on the 2D region of interest set on the 2D substrate image in S2018. Further, the processor 130 is configured to display the 3D region of interest on the 3D substrate image on the display part 140 in S2020. According to an embodiment, the processor 130 is configured to generate the 3D region of interest based on geometrical position information of the 2D region of interest set (displayed) on the 2D substrate image.

Selectively, the processor 130 may reset at least two regions of interest set on the 2D substrate image, as illustrated in FIGS. 5 to 12C according to the first embodiment.

Fifth Embodiment

Figure 21:
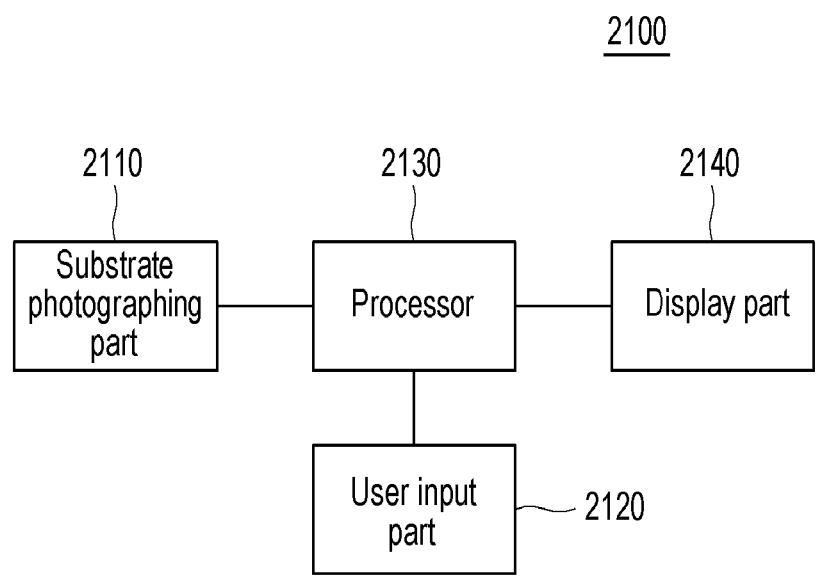
FIG. 21 is a block diagram schematically illustrating the configuration of a substrate inspection system according to a fifth embodiment of the present disclosure.

FIG. 21 is a block diagram schematically illustrating the configuration of a substrate inspection system according to a fifth embodiment of the present disclosure. Referring to FIG. 21, a substrate inspection system 2100 includes a substrate photographing part 2110.

The substrate photographing part 2110 is configured to radiate a light on a substrate having an inspection object, and receive the light reflected from the substrate so as to acquire image data corresponding to the inspection object in the substrate. In the present embodiment, the image data includes a plurality of view data.

Figure 22:
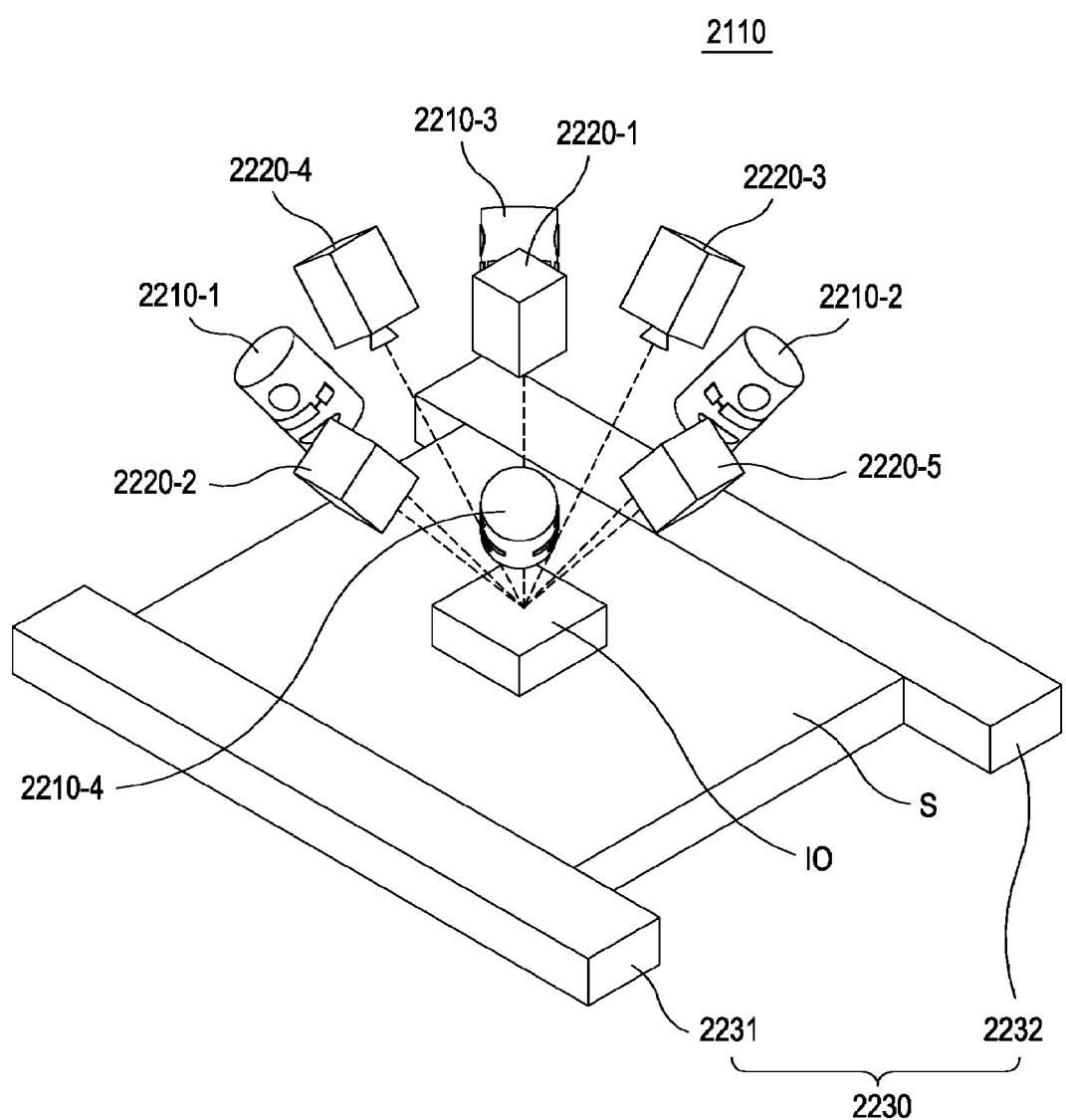
FIG. 22 is a diagram schematically illustrating the configuration of a substrate photographing part of FIG. 21.

FIG. 22 is a diagram schematically illustrating the substrate photographing part 2110 according to the fifth embodiment of the present disclosure. Referring to FIG. 22, the substrate photographing part 2110 includes projection portions 2210-1, 2210-2, 2210-3 and 2210-4. The projection portions 2210-1, 2210-2, 2210-3 and 2210-4 are configured to radiate a pattern light on the substrate S to measure the shape of an inspection object IO that is formed on the substrate S. Since the projection portions 2210-1, 2210-2, 2210-3 and 2210-4 in the present embodiment are similar to the projection portions 210-1 and 210-2 in the first embodiment, a detailed description thereof will be omitted.

The substrate photographing part 2110 further includes imaging portions 2220-1 to 2220-5. The imaging portions 2220-1 to 2220-5 are configured to receive the light that is radiated by the projection portions 2210-1, 2210-2, 2210-3 and 2210-4 and reflected from the substrate S, and acquire image data corresponding to the substrate S. That is, the imaging portions 2220-1 to 2220-5 are configured to acquire image data corresponding to the substrate S by photographing the substrate S through the radiation of the pattern light by the projection portions 2210-1 to 2210-4. The imaging portions 2220-1 to 2220-5 include a Charge-Coupled Device (CCD) camera or a Complementary Metal Oxide Semiconductor (CMOS) camera, but are not limited thereto.

In the present embodiment, the imaging portion 2220-1 is installed at an upper position perpendicular to the substrate S, and the imaging portions 2220-2 to 2220-5 are separated from each other at a predetermined angle in a circumferential direction, and are installed below the imaging portion 2220-1.

Each of the imaging portions 2220-1 to 2220-5 is configured to acquire image data (hereinafter, referred to as "view data") of a corresponding view. That is, the imaging portion 2220-1 is configured to acquire view data (hereinafter, referred to as "top view data") corresponding to a top view of the substrate S. The imaging portion 2220-2 is configured to acquire view data (hereinafter, referred to as "front view data") corresponding to a front view of the substrate S. The imaging portion 2220-3 is configured to acquire view data (hereinafter, referred to as "rear view data") corresponding to a rear view of the substrate S. The imaging portion 2220-4 is configured to acquire view data (hereinafter, referred to as "left view data") corresponding to a left view of the substrate S. The imaging portion 2220-5 is configured to acquire view data (hereinafter, referred to as "right view data") corresponding to a right view of the substrate S.

Although it has been described that the substrate inspection system 2100 includes five imaging portions 2220-1 to 2220-5 in the above-described example, the present disclosure is not necessarily limited thereto, and the number of imaging portions may vary as needed.

The substrate photographing part 2110 further includes a stage 2230. The stage 2230 supports and fixes the substrate S. Since the stage 2230 in the present embodiment is the same as the stage 230 in the first embodiment, a detailed description thereof will be omitted in the present embodiment.

The substrate photographing part 2110 illustrated in FIG. 22 is one embodiment of substrate inspection devices which may acquire image data corresponding to the substrate S, but is not necessarily limited to the shape illustrated in FIG. 22.

Referring back to FIG. 21, the substrate inspection system 2100 further includes a user input part 2120. The user input part 2120 is configured to receive input information for setting a region of interest with respect to a substrate image corresponding to the substrate S from the user. Further, the user input part 2120 is configured to receive input information for adjusting reference data for a plurality of view data and setting an inspection condition for the region of interest.

The substrate inspection system 2100 further includes a processor 2130. The processor 2130 is configured to generate a substrate image based on image data (that is, view data) provided from the substrate photographing part 2110. According to an embodiment, the substrate image includes a 3D image. According to an embodiment, the substrate image includes a 3D image corresponding to each of a plurality of view data. According to an embodiment, the substrate image may be an image corresponding to the entire substrate S, a part of the substrate S, or one inspection object IO. Further, the processor 2130 is configured to display the region of interest for the substrate image on the display part 140 based on the input information provided from the user input part 2120. In addition, the processor 2130 is configured to determine whether the substrate S is good or not good by inspecting the region of interest set on the substrate image.

The substrate inspection system 2100 further includes a display part 2140. The display part 2140 is configured to three-dimensionally display the substrate image generated by the processor 2130. Further, the display part 2140 is configured to three-dimensionally display the region of interest set on the substrate image. The display part 2140 includes a Liquid Crystal Display (LCD), a touch screen, and the like, but is not necessarily limited thereto.

Figure 23:
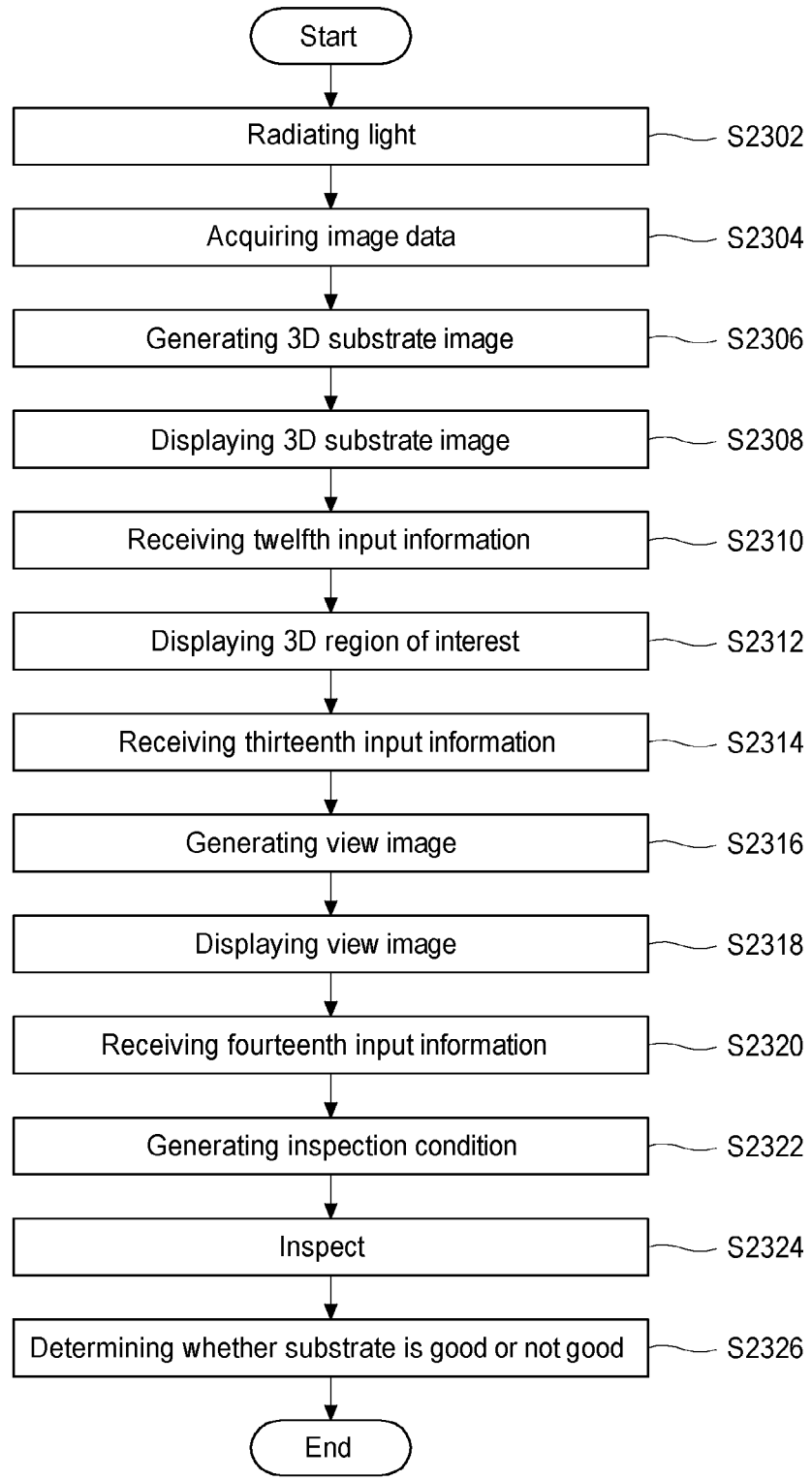
FIG. 23 is a flowchart illustrating a process of performing substrate inspection according to the fifth embodiment of the present disclosure.

FIG. 23 is a flowchart illustrating a process of performing substrate inspection according to an embodiment of the present disclosure. Referring to FIG. 23, the substrate photographing part 2110 is configured to generate light for acquiring a substrate image, and radiate the light on the substrate S in S2302. Further, the substrate photographing part 2110 is configured to acquire image data of the substrate S by receiving the light reflected from the substrate S in S2304. In the present embodiment, the image data includes view data corresponding to each of the imaging portions 2220-1 to 2220-5.

The processor 2130 is configured to generate a substrate image based on the image data provided from the substrate photographing part 2110 in S2306. In the present embodiment, the substrate image is a 3D substrate image. The 3D substrate image generated by the processor 2130 is displayed on the display part 2140 in S2308.

When input information (hereinafter, referred to as "twelfth input information") for setting a region of interest at a particular position of the 3D substrate image is received through the user input part 2120 in S2310, the processor 2130 is configured to display a 3D region of interest on the display part 2140 in accordance with the twelfth input information in S2312. Since the twelfth input information is the same as the ninth input information in the second embodiment, a detailed description thereof will be omitted in the present embodiment.

Figure 24:
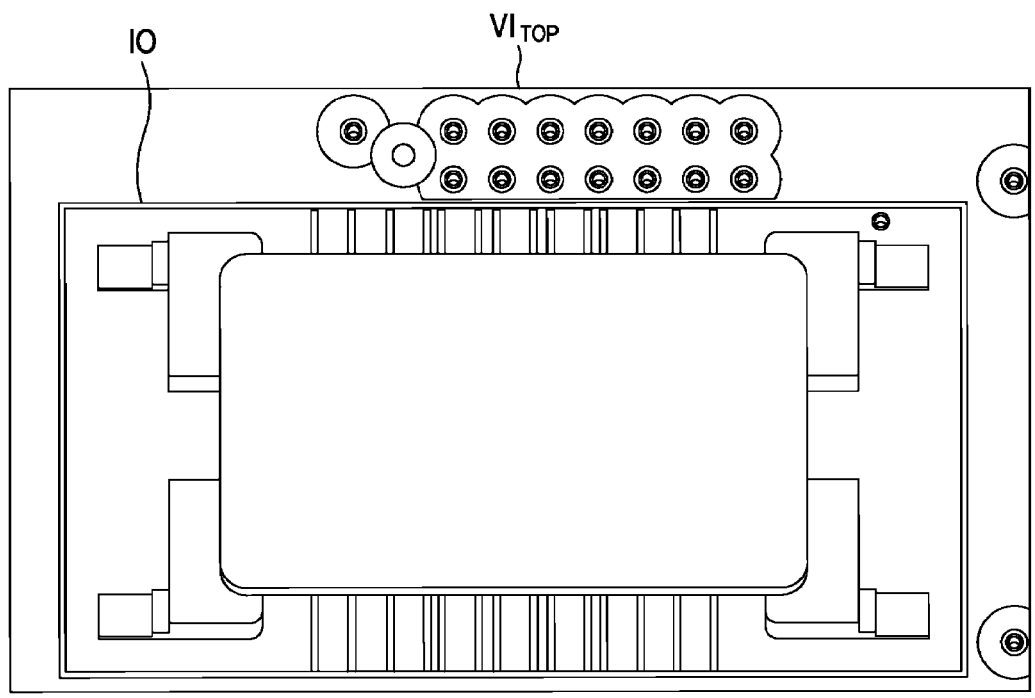
FIG. 24 illustrates an example of a top view image according to the fifth embodiment of the present disclosure.

When input information (hereinafter, referred to as "thirteenth input information") for selecting one of a plurality of views is received through the user input part 2120 in S2314, the processor 2130 is configured to generate a view image based on view data corresponding to the thirteenth input information in S2316. The view image generated by the processor 2130 is displayed on the display part 2140 in S2318. For example, when the thirteenth input information for selecting a top view is received through the user input part 2120, the processor 2130 is configured to generate a top view image $VI_{TOP}$ corresponding to the top view based on the view data acquired by the imaging portion 2220-1, as illustrated in FIG. 24.

Figure 25:
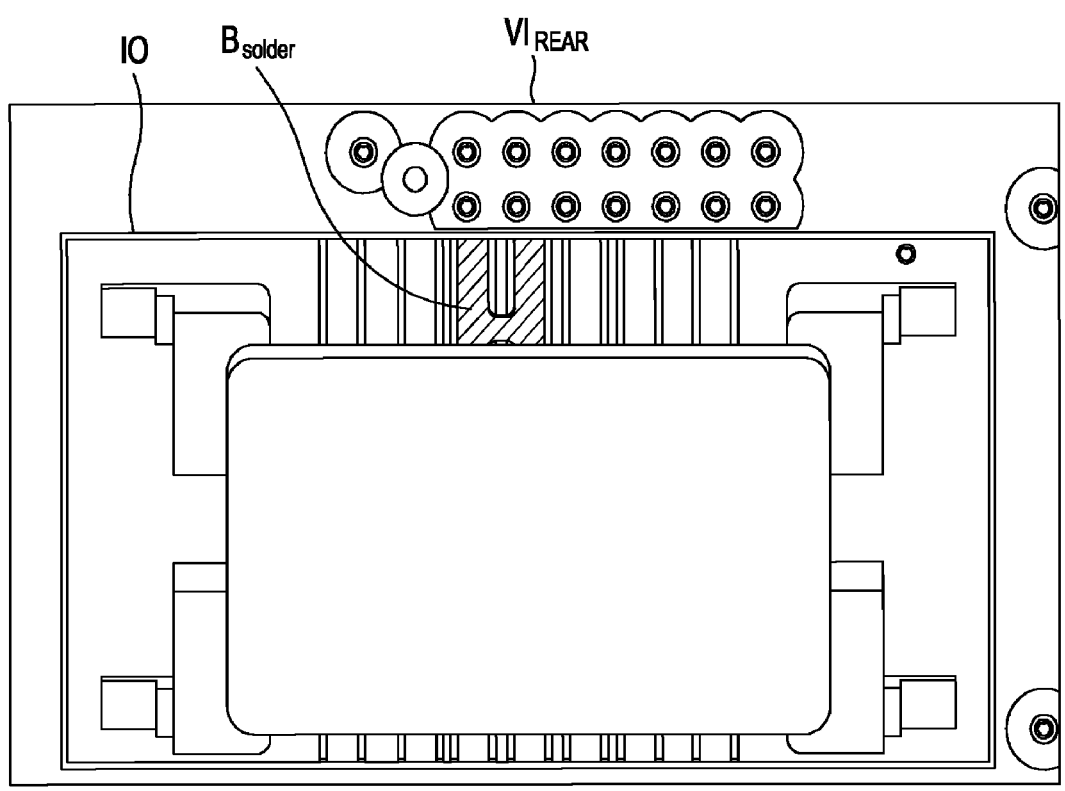
FIG. 25 illustrates an example of a rear view image according to the fifth embodiment of the present disclosure.

Further, when the thirteenth input information for selecting a rear view is received through the user input part 2120, the processor 2130 is configured to generate a rear view image $VI_{REAR}$ corresponding to the rear view based on the view data acquired by the third imaging portion 2220-3, as illustrated in FIG. 25. In FIG. 25, reference character $B_{solder}$ indicates a solder bridge.

Also, with respect to a front view, a left view, and a right view, the processor 2130 is configured to generate view images (a front view image, a left view image, and a right view image) based on the view data acquired by the corresponding imaging portions in accordance with the thirteenth input information.

Referring back to FIG. 23, when input information (hereinafter, referred to as "fourteenth input information") for setting an inspection condition for determining whether the inspection object is good or not good in the view image is received through the user input part 2120 in S2320, the processor 2130 is configured to generate the inspection condition in accordance with the fourteenth input information in S2322. For example, the processor 2130 is configured to generate the inspection condition for determining whether the inspection object IO is good or not good based on the fourteenth input information.

Selectively, when input information (hereinafter, referred to as "fifteenth input information") for adjusting reference data (for example, CAD data) of the substrate S with respect to each of a plurality of views is received through the user input part 2120, the processor 2130 may adjust the reference data in accordance with the fifteenth input information.

The processor 2130 is configured to determine whether the inspection object IO is good or not good by inspecting the 3D region of interest in each of the plurality of view images based on the generated inspection condition in S2324. For example, the processor 2130 is configured to determine whether the inspection object IO is good or not good by inspecting the 3D region of interest in each of the top view image $VI_{TOP}$, the rear view image $VI_{REAR}$, the front view image, the left view image, and the right view image based on the inspection condition.

The processor 2130 is configured to determine whether the substrate S is good or not good based on the determination of whether the inspection object IO is good or not good in each of the plurality of view images in S2326.

According to an embodiment, when it is determined that inspection object IO is good in a predetermined number of view images or more among the plurality of view images, the processor 2130 is configured to determine that the substrate S is good. Here, the predetermined number may be three, but is not necessarily limited thereto. For example, when it is determined that the inspection object IO is good in the top view image, the front view image and the rear view image, the processor 2130 is configured to determine that the substrate S is good. In another example, when it is determined that the inspection object IO is good in the front view image and the left view image, the processor 2130 is configured to determine that the substrate S is not good (NG).

According to another embodiment, when it is determined that the inspection object IO is not good in a predetermined number of view images or more among the plurality of view images, the processor 2130 is configured to determine that the substrate S is not good. Here, the predetermined number may be two, but is not necessarily limited thereto. For example, when it is determined that the inspection object IO is not good in the rear view image and the left view image, the processor 2130 is configured to determine that the substrate S is not good.

According to another embodiment, when it is determined that the inspection object IO is not good in one of the plurality of view images, the processor 2130 is configured to determine that the substrate S is not good. For example, when it is determined that the inspection object IO is not good by the solder bridge $B_{solder}$ in the rear view image, as illustrated in FIG. 25, the processor 2130 is configured to determine that the substrate S is not good.

Selectively, the quality result of the substrate S determined by the processor 2130 may be displayed on the display part 2140 in various forms.

Although it has been described that one inspection condition is generated and the 3D region of interest is inspected in each of the plurality of view images based on the generated inspection condition in the above-described embodiment, the present disclosure is not necessarily limited thereto, and an inspection condition may be generated for each of the plurality of view images, in which case the 3D region of interest in each of the plurality of view images may be inspected based on each inspection condition. Although a substrate inspection method performed by the processor is described through particular embodiments, the method can additionally be implemented as computer-readable code on a computer-readable recording medium. The computer-readable recording medium includes all types of recording devices that store computer-system-readable data. For example, the computer-readable recording medium includes a ROM, a RAM, a CD-ROM, a magnetic tape, a floppy disc, an optical data storage device, and the like, and also includes an implementation in the form of a carrier wave (for example, transmission over the Internet). Further, the computer-readable recording medium may be distributed across computer systems connected over a network, and thus may store and execute computer-readable code in a distributed manner. In addition, a functional program, code, and code segments for implementing the embodiments may be easily inferred by programmers skilled in the art.

Although the present disclosure has been described and illustrated through exemplary embodiments, it can be understood by those skilled in the art that various modifications and changes can be made without departing from the scope and the range of the accompanying claims.

What is claimed is:

1. A method of inspecting a substrate, the method comprising:
generating and displaying a 2D image of a substrate based on image data acquired from the substrate having an inspection object;
receiving, from a user, first input information including point data or line data for setting a region of interest at a plurality of particular positions of the 2D image; and
displaying the region of interest as a 2D region of interest having a shape that is set in accordance with the first input information received from the user,
wherein the 2D region of interest is resettable by combination of at least two regions or division into at least two regions, in response to an additional input information from the user.

2. The method of claim 1, wherein the 2D region of interest is at least two 2D regions of interest movable by dragging, and
wherein the at least two 2D regions of interest are capable of being reset as one 2D region of interest.

3. The method of claim 2, wherein the at least two 2D regions of interest are capable of being reset as one 2D region of interest by combining the at least two 2D regions of interest with each other.

4. The method of claim 2, wherein the displaying of the 2D region of interest comprises:
selecting a first 2D region of interest among the at least two 2D regions of interest; and
resetting the at least two 2D regions of interest as one 2D region of interest by removing a region that overlaps with the first 2D region of interest from a second 2D region of interest.

5. The method of claim 1, wherein the 2D region of interest is capable of being reset as at least two 2D regions of interest.

6. The method of claim 1, wherein the 2D region of interest corresponds to at least two 2D regions of interest, and
wherein the method further comprises:

displaying the at least two 2D regions of interest with outlines by performing outline processing for displaying the at least two 2D regions of interest only with the outlines;

receiving, from the user, third input information for selecting at least one 2D region of interest from the at least two 2D regions of interest in which the outline processing has been performed; and resetting the at least one selected 2D region of interest as a new 2D region of interest in accordance with the third input information.

7. The method of claim 1, wherein generating and displaying the 2D image of the substrate comprises:

generating and displaying a 3D image of the substrate based on the image data; and generating and displaying a 2D development image, which is two-dimensionally developed from the 3D image, as the 2D image of the substrate.

8. The method of claim 7, further comprising generating and displaying a 3D region of interest having a 3D shape based on the 2D region of interest.

9. The method of claim 1, wherein the 2D image comprises a 2D view image corresponding to each of a plurality of 2D views.

10. The method of claim 9, further comprising:

generating and displaying a 3D image of the substrate based on the image data; and generating a 3D region of interest having a 3D shape to overlappingly display the generated 3D region of interest on the 3D image, based on the 2D region of interest set on the 2D view image corresponding to each of the plurality of 2D views.

11. A system for inspecting a substrate, the system comprising:

a processor configured to generate a 2D image of the substrate based on image data acquired from the substrate including an inspection object;

a display part configured to display the 2D image; and a user input part configured to receive, from a user, first input information including point data or line data for setting a region of interest at a plurality of particular positions of the 2D image, wherein the processor is further configured to display the region of interest as a 2D region of interest having a shape in accordance with the first input information received from the user, and wherein the 2D region of interest is resettable by combination of at least two regions or division into at least two regions, in response to an additional input information from the user.

12. The system of claim 11, wherein the 2D region of interest is at least two 2D regions of interest movable by dragging, and wherein the at least two 2D regions of interest are capable of being reset as one 2D region of interest.

13. The system of claim 12, wherein the processor is configured to reset the at least two 2D regions of interest as one 2D region of interest by combining the at least two 2D regions of interest.

14. The system of claim 12, wherein the processor is configured to select a first 2D region of interest among the at least two 2D regions of interest, and to reset the at least two 2D regions of interest as one 2D region of interest by removing a region that overlaps with the first 2D region of interest from a second 2D region of interest.

15. The system of claim 11, wherein the 2D region of interest is capable of being reset as at least two 2D regions of interest.

16. The system of claim 11, wherein the 2D region of interest corresponds to at least two 2D regions of interest, and wherein the processor is configured to display the at least two 2D regions of interest with outlines by performing outline processing for displaying the at least two 2D regions of interest only with the outlines, and wherein the user input part is configured to receive, from the user, third input information for selecting at least one 2D region of interest from the at least two 2D regions of interest in which the outline processing has been performed, and wherein the processor is configured to reset the selected 2D region of interest as a new 2D region of interest in accordance with the third input information.

17. The system of claim 11, wherein the processor is configured to generate a 3D image of the substrate based on the image data, and to generate a 2D development image, which is two-dimensionally developed from the 3D image, as the 2D image.

18. The system of claim 17, wherein the processor is further configured to generate a 3D region of interest having a 3D shape based on the 2D region of interest, and to overlappingly display the 3D image and the 3D region of interest.

19. The system of claim 11, wherein the 2D image comprises a 2D view image corresponding to each of a plurality of 2D views.

20. The system of claim 19, wherein the processor is configured to:

generate a 3D image of the substrate based on the image data;

generate a 3D region of interest having a 3D shape, based on the 2D region of interest set on the 2D view image corresponding each of the plurality of 2D views; and overlappingly display the 3D image and the 3D region of interest.

* * * * *